US011974283B2

(12) United States Patent
Saggar et al.

(10) Patent No.: US 11,974,283 B2
(45) Date of Patent: Apr. 30, 2024

(54) IMPLICIT UPLINK CONTROL CHANNEL RESOURCE ALLOCATION

(71) Applicant: QUALCOMM Incorporated, San Diego, CA (US)

(72) Inventors: Hemant Saggar, Irvine, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 17/207,131

(22) Filed: Mar. 19, 2021

(65) Prior Publication Data

US 2022/0303977 A1   Sep. 22, 2022

(51) Int. Cl.
*H04W 72/21* (2023.01)
*H04B 7/06* (2006.01)
*H04L 1/00* (2006.01)
*H04L 5/00* (2006.01)
*H04W 72/1268* (2023.01)

(52) U.S. Cl.
CPC .......... *H04W 72/21* (2023.01); *H04B 7/0626* (2013.01); *H04L 1/0025* (2013.01); *H04L 5/0053* (2013.01); *H04W 72/1268* (2013.01)

(58) Field of Classification Search
CPC .......... H04W 72/0413; H04W 72/1268; H04B 7/0626; H04L 1/0025; H04L 5/0053
USPC ........................................................ 370/329
See application file for complete search history.

(56) References Cited

U.S. PATENT DOCUMENTS

| | | | |
|---|---|---|---|
| 9,674,809 B1* | 6/2017 | Ramamurthy | .... H04W 72/0453 |
| 11,653,358 B2 | 5/2023 | Gurelli | |
| 11,683,127 B2 | 6/2023 | Park | |
| 2013/0155914 A1* | 6/2013 | Wang | ....................... H04L 5/001 370/280 |
| 2014/0192730 A1* | 7/2014 | Seo | ........................ H04L 5/0053 370/329 |
| 2015/0043394 A1* | 2/2015 | Lin | ........................ H04L 1/1812 370/280 |
| 2016/0057737 A1* | 2/2016 | Kim | ........................ H04W 72/23 370/329 |
| 2018/0123769 A1* | 5/2018 | Pelletier | ................... H04L 5/001 |

(Continued)

FOREIGN PATENT DOCUMENTS

WO   WO-2021226923 A1   11/2021

*Primary Examiner* — Chi Tang P Cheng
(74) *Attorney, Agent, or Firm* — QUALCOMM Incorporated

(57) ABSTRACT

Methods, systems, and devices for wireless communications are described. In a wireless communications system, a user equipment (UE) may receive an indication from a base station that a downlink shared channel resource in a scheduled occasion, such as a semi-persistently scheduled occasion, includes downlink control information (DCI). The UE may monitor the downlink shared channel resource for the DCI based on the indication. The UE may determine a set of uplink control channel resources based on one or more parameters of the DCI and the downlink shared channel resource. The parameters of the DCI on the semi-persistently scheduled downlink shared channel may implicitly indicate the set of uplink control channel resources to the UE. The UE may transmit an uplink control message to the base station using the set of uplink control channel resources.

30 Claims, 17 Drawing Sheets

(56) References Cited

U.S. PATENT DOCUMENTS

2019/0230644 A1\* 7/2019 Cheng .............. H04W 72/0406
2021/0345387 A1 11/2021 Gurelli \* cited by examiner

IMPLICIT UPLINK CONTROL CHANNEL RESOURCE ALLOCATION

FIELD OF TECHNOLOGY

The following relates to wireless communications, including implicit uplink control channel resource allocation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station may transmit control information to a UE using a downlink control channel. The control information may indicate uplink resources for use by the UE for uplink transmissions to the base station. Techniques for indicating uplink resources, however, may be inefficient or may rely on information that is unavailable or otherwise unused in various communication scenarios.

SUMMARY

The described techniques relate to improved methods, systems, devices, and apparatuses that support implicit uplink control channel resource allocation. Generally, the described techniques provide for a UE to receive implicit indication of a physical uplink control channel (PUCCH) resource set based on parameters of downlink control information (DCI) transmitted on a semi-persistent scheduling (SPS) physical downlink shared channel (PDSCH). A user equipment (UE) may identify parameters of the PUCCH resource set using the parameters of the DCI multiplexed with PDSCH over an SPS occasion. The UE may calculate an index to a table of PUCCH resource sets using a combination of the parameters (e.g., frequency parameters, time parameters, spatial parameters, or a combination thereof) of the SPS-PDSCH DCI. For example, the frequency parameters may include parameters such as a starting resource block (RB) or resource element (RE) or a length of the DCI in frequency, and the time parameters may include parameters such as a starting symbol or a length of the DCI in time. The UE may transmit an uplink control message using the uplink control channel resource set.

In some cases, the table may support a many-to-one mapping, such that multiple different combinations of parameters map to the same PUCCH resource set. In some cases, the PUCCH resource set may provide sufficient resources for the UE to transmit an uplink control message to the base station. In some cases, the uplink control message sent by the UE may include a feedback message, a channel state information (CSI) report, a scheduling request, or any combination thereof, or information based on any combination thereof. The described techniques may thereby promote higher reliability and reduce the amount of signaling overhead needed, among other benefits, which may be valuable for low-capability devices.

A method for wireless communications at a UE is described. The method may include receiving, from a base station, an indication that a downlink shared channel resource in a scheduled occasion includes DCI, monitoring the downlink shared channel resource in the scheduled occasion for the DCI based on the indication, determining a set of uplink control channel resources based on one or more parameters of the DCI and the downlink shared channel resource, and transmitting an uplink control message to the base station using the set of uplink control channel resources.

An apparatus for wireless communications at a UE is described. The apparatus may include a processor, memory coupled with the processor, and instructions stored in the memory. The instructions may be executable by the processor to cause the apparatus to receive, from a base station, an indication that a downlink shared channel resource in a scheduled occasion includes DCI, monitor the downlink shared channel resource in the scheduled occasion for the DCI based on the indication, determine a set of uplink control channel resources based on one or more parameters of the DCI and the downlink shared channel resource, and transmit an uplink control message to the base station using the set of uplink control channel resources.

Another apparatus for wireless communications at a UE is described. The apparatus may include means for receiving, from a base station, an indication that a downlink shared channel resource in a scheduled occasion includes DCI, means for monitoring the downlink shared channel resource in the scheduled occasion for the DCI based on the indication, means for determining a set of uplink control channel resources based on one or more parameters of the DCI and the downlink shared channel resource, and means for transmitting an uplink control message to the base station using the set of uplink control channel resources.

A non-transitory computer-readable medium storing code for wireless communications at a UE is described. The code may include instructions executable by a processor to receive, from a base station, an indication that a downlink shared channel resource in a scheduled occasion includes DCI, monitor the downlink shared channel resource in the scheduled occasion for the DCI based on the indication, determine a set of uplink control channel resources based on one or more parameters of the DCI and the downlink shared channel resource, and transmit an uplink control message to the base station using the set of uplink control channel resources.

In some examples of the method, apparatuses, and non-transitory computer-readable medium described herein, determining the set of uplink control channel resources may include operations, features, means, or instructions for determining an index of a table of uplink control channel resource sets based on the one or more parameters of the DCI and selecting the set of uplink control channel resources from the table of uplink control channel resource sets based on the index.

In some examples of the method, apparatuses, and non-transitory computer-readable medium described herein, the table of uplink control channel resource sets includes a set of multiple uplink control channel resources with a set of multiple sizes based on a length in time, a length in frequency, cyclic shift information, cover code information, or any combination thereof.

In some examples of the method, apparatuses, and non-transitory computer-readable medium described herein, determining the set of uplink control channel resources may include operations, features, means, or instructions for identifying a field of the DCI, the field indicating the set of uplink control channel resources, where the set of uplink control channel resources may be identified based on the field indicating the set of uplink control channel resources.

In some examples of the method, apparatuses, and non-transitory computer-readable medium described herein, the one or more parameters of the DCI on the downlink shared channel resource implicitly indicate the set of uplink control channel resources.

In some examples of the method, apparatuses, and non-transitory computer-readable medium described herein, determining the set of uplink control channel resources may include operations, features, means, or instructions for identifying one or more frequency parameters, one or more time parameters, one or more space parameters, or any combination thereof of the one or more parameters of the DCI, where the set of uplink control channel resources may be based on the one or more frequency parameters, one or more time parameters, one or more space parameters, or any combination thereof.

In some examples of the method, apparatuses, and non-transitory computer-readable medium described herein, the one or more frequency parameters include a starting resource block or a starting resource element of the DCI within the downlink shared channel resource, a length of the DCI in frequency, a frequency interleaving pattern of the DCI, a frequency hopping pattern of the DCI, or any combination thereof.

In some examples of the method, apparatuses, and non-transitory computer-readable medium described herein, the one or more time parameters include a starting symbol of the DCI in the downlink shared channel resource, a length of the DCI in time, a time interleaving pattern of the DCI, a code used for DCI bits, or any combination thereof.

In some examples of the method, apparatuses, and non-transitory computer-readable medium described herein, the one or more space parameters include antennas used for transmission of the DCI on the downlink shared channel resource or a transmission configuration indicator (TCI) state configured for the DCI, or both.

In some examples of the method, apparatuses, and non-transitory computer-readable medium described herein, the one or more parameters include a format of the DCI, a location of demodulation reference signal symbols allocated to the DCI within the downlink shared channel resource, a radio network temporary identifier (RNTI) used to scramble a cyclic redundancy check of the DCI, a cyclic shift used for bits of the DCI, or any combination thereof.

In some examples of the method, apparatuses, and non-transitory computer-readable medium described herein, a set of multiple different sets of parameters for the DCI transmitted on the downlink shared channel resource correspond to the set of uplink control channel resources.

In some examples of the method, apparatuses, and non-transitory computer-readable medium described herein, the control message includes a hybrid automatic repeat request (HARQ) feedback, a CSI report, a scheduling request, or any combination thereof.

In some examples of the method, apparatuses, and non-transitory computer-readable medium described herein, receiving the indication that the downlink shared channel resource in the scheduled occasion includes the DCI may include operations, features, means, or instructions for receiving a second DCI on a downlink control channel indicating that the downlink shared channel resource includes the DCI.

A method for wireless communications at a base station is described. The method may include transmitting, to a UE, an indication that a downlink shared channel resource in a scheduled occasion includes DCI, transmitting the DCI on the downlink shared channel resource for the DCI based on the indication, determining a set of uplink control channel resources based on one or more parameters of the DCI and the downlink shared channel resource, and receiving an uplink control message from the UE on the set of uplink control channel resources.

An apparatus for wireless communications at a base station is described. The apparatus may include a processor, memory coupled with the processor, and instructions stored in the memory. The instructions may be executable by the processor to cause the apparatus to transmit, to a UE, an indication that a downlink shared channel resource in a scheduled occasion includes DCI, transmit the DCI on the downlink shared channel resource for the DCI based on the indication, determine a set of uplink control channel resources based on one or more parameters of the DCI and the downlink shared channel resource, and receive an uplink control message from the UE on the set of uplink control channel resources.

Another apparatus for wireless communications at a base station is described. The apparatus may include means for transmitting, to a UE, an indication that a downlink shared channel resource in a scheduled occasion includes DCI, means for transmitting the DCI on the downlink shared channel resource for the DCI based on the indication, means for determining a set of uplink control channel resources based on one or more parameters of the DCI and the downlink shared channel resource, and means for receiving an uplink control message from the UE on the set of uplink control channel resources.

A non-transitory computer-readable medium storing code for wireless communications at a base station is described. The code may include instructions executable by a processor to transmit, to a UE, an indication that a downlink shared channel resource in a scheduled occasion includes DCI, transmit the DCI on the downlink shared channel resource for the DCI based on the indication, determine a set of uplink control channel resources based on one or more parameters of the DCI and the downlink shared channel resource, and receive an uplink control message from the UE on the set of uplink control channel resources.

In some examples of the method, apparatuses, and non-transitory computer-readable medium described herein, determining the set of uplink control channel resources may include operations, features, means, or instructions for determining an index of a table of uplink control channel resource sets based on the one or more parameters of the DCI and selecting the set of uplink control channel resources from the table of uplink control channel resource sets based on the index.

In some examples of the method, apparatuses, and non-transitory computer-readable medium described herein, determining the set of uplink control channel resources may include operations, features, means, or instructions for identifying a field of the DCI, the field indicating the set of uplink control channel resources, where the set of uplink control channel resources may be identified based on the field indicating the set of uplink control channel resources.

In some examples of the method, apparatuses, and non-transitory computer-readable medium described herein, the one or more parameters of the DCI on the downlink shared channel resource implicitly indicate the set of uplink control channel resources.

In some examples of the method, apparatuses, and non-transitory computer-readable medium described herein, determining the set of uplink control channel resources may include operations, features, means, or instructions for identifying one or more frequency parameters, one or more time parameters, one or more space parameters, or any combination thereof of the one or more parameters of the DCI, where the set of uplink control channel resources may be based on the one or more frequency parameters, one or more time parameters, one or more space parameters, or any combination thereof.

In some examples of the method, apparatuses, and non-transitory computer-readable medium described herein, the one or more frequency parameters include a starting resource block or a starting resource element of the DCI within the downlink shared channel resource, a length of the DCI in frequency, a frequency interleaving pattern of the DCI, a frequency hopping pattern of the DCI, or any combination thereof.

In some examples of the method, apparatuses, and non-transitory computer-readable medium described herein, the one or more time parameters include a starting symbol of the DCI in the downlink shared channel resource, a length of the DCI in time, a time interleaving pattern of the DCI, a code used for DCI bits, or any combination thereof.

In some examples of the method, apparatuses, and non-transitory computer-readable medium described herein, the one or more space parameters include antennas used to transmit the DCI on the downlink shared channel resource or a TCI state configured for the DCI, or both.

In some examples of the method, apparatuses, and non-transitory computer-readable medium described herein, the one or more parameters include a format of the DCI, a location of demodulation reference signal symbols allocated to the DCI within the downlink shared channel resource, an RNTI used to scramble a cyclic redundancy check of the DCI, a cyclic shift used for bits of the DCI, or any combination thereof.

In some examples of the method, apparatuses, and non-transitory computer-readable medium described herein, a set of multiple different sets of parameters for the DCI transmitted on the downlink shared channel resource correspond to the set of uplink control channel resources.

In some examples of the method, apparatuses, and non-transitory computer-readable medium described herein, receiving the uplink control message may include operations, features, means, or instructions for receiving an HARQ feedback message, a CSI report, a scheduling request, or any combination thereof.

In some examples of the method, apparatuses, and non-transitory computer-readable medium described herein, transmitting the indication that the downlink shared channel resource in the scheduled occasion includes the DCI may include operations, features, means, or instructions for transmitting a second DCI on a downlink control channel indicating that the downlink shared channel resource includes the DCI.

DETAILED DESCRIPTION

Figure 1:
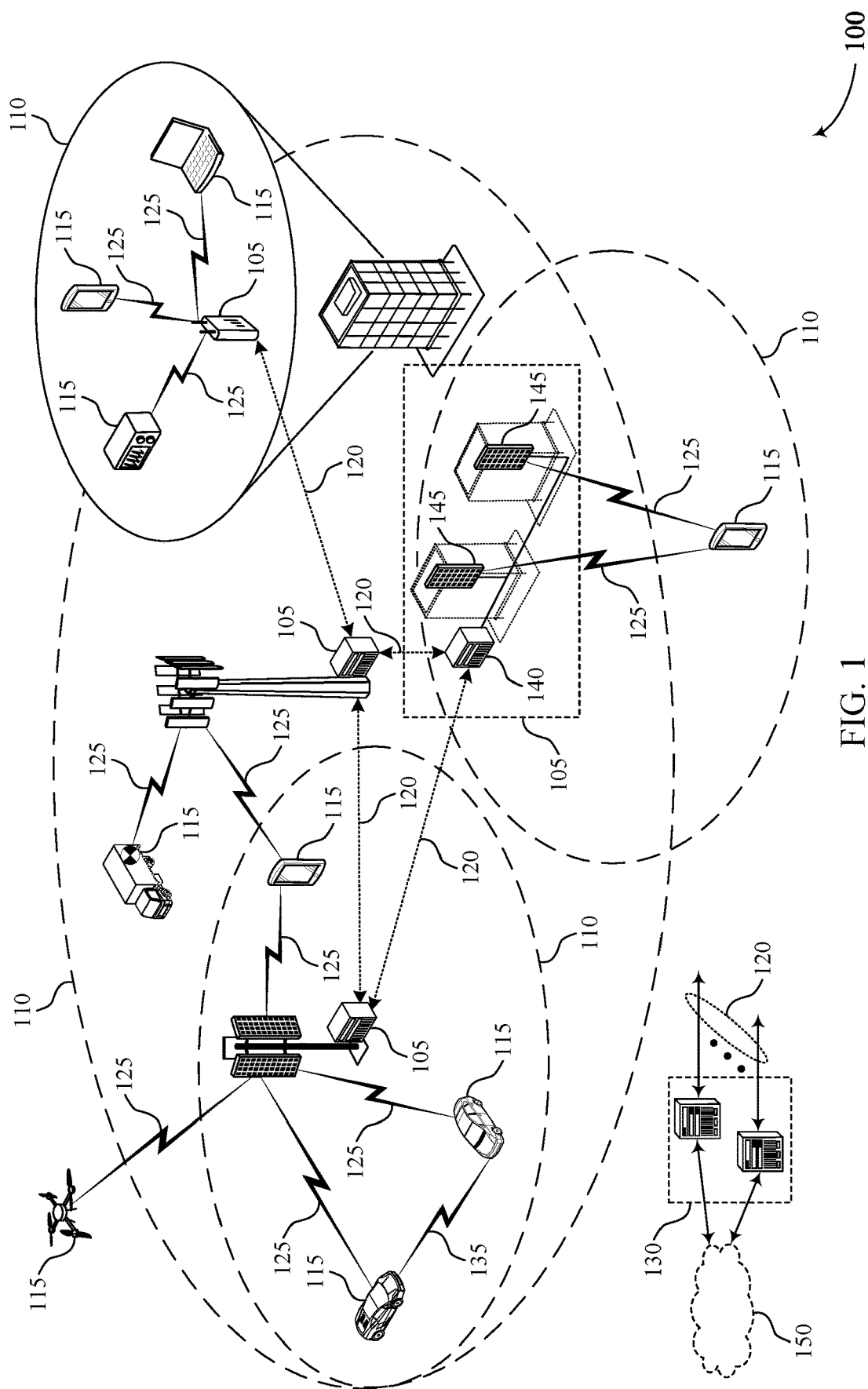
FIG. 1 illustrates an example of a wireless communications system that supports implicit uplink control channel resource allocation in accordance with aspects of the present disclosure.

Some wireless communications systems may utilize semi-persistent resources (e.g., semi-persistent resource occasions) for communications in the downlink (e.g., semi-persistent scheduling (SPS) resources) and for communications in the uplink (e.g., configured grant (CG) resources). Such resources may be radio resource control (RRC) configured for a UE by a base station. For example, a UE may be configured with SPS resources for downlink transmissions from a base station. In some cases, a base station may transmit downlink control information (DCI) over SPS physical downlink shared channel (PDSCH) resources to reduce signaling overhead. In some cases, a network may transmit DCI on a physical downlink control channel (PDCCH) core resource set (CORESET) to schedule a PDSCH or release an SPS-PDSCH. The network may support implicitly allocating physical uplink control channel (PUCCH) resources for an uplink control message based on parameters of the DCI in the CORESET, such as to provide hybrid automatic repeat request (HARQ) feedback for the data transmitted on the PDSCH resource. In some cases, the parameters of the DCI in the CORESET, such as the indices of control channel elements (CCEs) used, may implicitly indicate the resources allocated for PUCCH. SPS-PDSCH resources may not use the same configurations for resources, such as CCEs or CORESETs. Therefore some systems may not support implicit PUCCH allocation for SPS-PDSCH DCI.

Techniques described herein support implicitly indicating a PUCCH resource set allocation based on a DCI transmitted on SPS-PDSCH. In some cases, a UE may identify parameters of the uplink control channel resource set (e.g., the PUCCH resource set) using the parameters of the DCI multiplexed with PDSCH over an SPS occasion. For example, a combination of parameters of the DCI transmitted on SPS-PDSCH, such as frequency parameters, time parameters, spatial parameters, or other parameters, may implicitly indicate an allocated PUCCH resource set for the UE. The frequency parameters may include parameters such as a starting resource block (RB) or resource element (RE) or a length of the DCI in frequency, the time parameters may include parameters such as a starting symbol or a length of the DCI in time, and the spatial parameters may include parameters such as the antennas used for transmission of the DCI, among others.

In some cases, the UE may calculate an index to a table of PUCCH resource sets using a combination of the parameters of the SPS-PDSCH DCI. In some cases, the table may support a many-to-one mapping, such that multiple different combinations of parameters map to the same uplink control channel resource set. In some cases, the uplink control channel resource set may provide sufficient resources for an uplink control message to be transmitted by the UE. For example, the table of PUCCH resource sets may include multiple different sizes or configurations for uplink control channel resource sets. For example, the table may include uplink control channel resource sets that can be used to transmit a HARQ acknowledgement (ACK) or negative ACK (NACK) message, a channel state information (CSI) report, a scheduling request, or any combination thereof. In some cases, the table may include different uplink control channel resources based on different resource sizes (e.g., in time or frequency), cyclic shift information, cover code information, or any combination thereof.

Aspects of the present disclosure may be implemented to realize one or more of the following potential advantages or improvements, among others. The present disclosure may provide benefits and enhancements to the operation of a UE. For example, operations performed by the UE may provide improvements when allocating resources for uplink transmissions. By supporting implicit PUCCH resource indication by a DCI transmitted on SPS-PDSCH, a UE may reduce signaling overhead. Reducing the signaling overhead may be beneficial for low-capability devices such as surveillance cameras, smartwatches, medical wearables, and the like. Additionally, configuring the UE to support implicit PUCCH resource indication may also provide improvements in latency and reliability of uplink communications.

Aspects of the disclosure are initially described in the context of wireless communications systems. Aspects of the disclosure are then described in the context of an uplink resource indication scheme and a process flow. Aspects of the disclosure are further illustrated by and described with reference to apparatus diagrams, system diagrams, and flowcharts that relate to implicit uplink control channel resource allocation.

FIG. 1 illustrates an example of a wireless communications system 100 that supports implicit uplink control channel resource allocation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or RBs) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, coded DCI bits may be mapped to a certain structure based on CCEs and resource element groups (REGs), where one REG is equal to 12 subcarriers in frequency and one OFDM symbol in time, and one CCE is equal to 6 REGs. In some cases, PDCCH may be transmitted according to an aggregation level, which may correspond to a number of contiguous CCEs (e.g., 1, 2, 4, 8, or 16). CCE to REG mapping may be non-interleaved (e.g., contiguous REGs) or interleaved (e.g., non-contiguous REGs). In some cases, the number of REG bundles (e.g., groups of REGs) within a CCE may vary.

In some cases, PUCCH may use a single port (e.g., a single layer) where PDCCH and PDSCH may use multiple ports (e.g., multiple layers). Beamforming may be applied to PUCCH using quasi co-location (QCL) relations between downlink reference signals and PUCCH. In such cases, there is reciprocity such that a receiving beam on a downlink may become a transmitting beam on an uplink. In some cases, QCL relations may be configured, and MAC-CE may be used to indicate which QCL relation to use.

In some cases, a UE 115 may be configured to use a PUCCH format for PUCCH transmissions. For example, a PUCCH format 0 may allow at most 2 bits on 1-2 symbols (e.g., short bits), and may support HARQ feedback, scheduling requests, and frequency hopping. A PUCCH format 1 may support at most 2 bits on 4-14 OFDM symbols (e.g., long bits), and may support tens of code-multiplexed devices per PUCCH, frequency hopping, and about 50% of reference signals transmission. A PUCCH format 2 may support more than 2 bits on 1-2 symbols (e.g., short bits), and may support CSI-reporting, HARQ feedback, and scheduling requests on an OFDM based waveform. A PUCCH format 3 may support more than 2 bits on 4-14 OFDM symbols (e.g., long bits), may carry both reference signals and data, and may support frequency hopping and direct Fourier transform (DFT) precoding. A PUCCH format 4 may be the same as format 3 but implementing code division multiplexing and using one RB, and format 4 may support one RB in frequency with two to four devices per RB.

In some examples, uplink control information (UCI) may include a combination of HARQ ACK/NACK, scheduling requests, and CSI-RS reports. UCI may be sent on either PUCCH or physical uplink shared channel (PUSCH) resources, and HARQ-ACK/NACK may be sent in response to each scheduled SPS resource or SPS-PDSCH. In some examples, a DCI may schedule a PDSCH or release an SPS-PDSCH and may also configure a PUCCH resource used to transmit the HARQ ACK/NACK. In some cases, the network may implicitly indicate the PUCCH resources to carry HARQ ACK/NACK based on parameters of the DCI. For example, the PUCCH resource allocation may include a starting physical RB (PRB), a length of PRBs, a format, a duration in time, a starting symbol, and the like. The resource allocation may also include a set of initial cyclic shift indices for a PUCCH resource, an indication of intra-slot frequency hopping, an index of first PRB and second PRB when frequency hopping is enabled, an index of the first and second interlace, and an index of an RB for an inter-cell guard band.

In some cases, an implicit indication table may be used for PUCCH resource configuration. For example, if a UE 115 does not have a dedicated PUCCH resource configuration (e.g., provided by PUCCH-ResourceSet in PUCCH-Config), a parameter in a table (e.g., PUCCH-ResourceCommon) may provide a PUCCH resource set through an index to a row of the table for transmission of HARQ ACK on PUCCH in an initial uplink BWP of $N_{BWP}^{size}$ PRBs. In some cases, the PUCCH resource set (e.g., table) may include a number of implicitly addressable PUCCH resources. For example, the PUCCH resource set may include sixteen resources, each corresponding to a PUCCH format, a first symbol, a duration, a PRB offset $RB_{BWP}^{offset}$, and a cyclic shift index set for a PUCCH transmission. In some cases, a PUCCH may also support frequency hopping and orthogonal code. For example, the UE 115 may transmit a PUCCH using frequency hopping if not provided otherwise (e.g., if not provided useInterlacePUCCH-Common-r16). In some cases, the UE 115 may transmit a PUCCH without frequency hopping. A PUCCH resource may also use an orthogonal cover code with index 0 (e.g., when the PUCCH format is 1). In some cases, if the UE 115 is not provided with a codebook (e.g., PDSCH-HARQ-ACK-Codebook), the UE 115 may generate one HARQ ACK information bit.

The UE 115 may calculate an implicit index of a table to determine a PUCCH resource. For example, the UE 115 may determine a PUCCH resource with index $r_{PUCCH}$, $0 < r_{PUCCH} \leq 15$, as $$r_{PUCCH} = \left\lceil \frac{2 \cdot n_{CCE,0}}{N_{CCE}} \right\rceil + 2 \cdot \Delta_{PRI},$$

where $N_{CCE}$ may represent a number of CCEs in a CORE-SET of a PDCCH with the DCI format, $n_{CCE,0}$ may represent the index of a first CCE for the PDSCH reception, and $\Delta_{PRI}$ may represent a value of the PUCCH resource indicator field in the DCI format. In some cases, the $N_{CCE}$ and $n_{CCE,0}$ may not be defined for DCI sent on an SPS-PDSCH. The implicit index calculation may result in one of multiple cases for PUCCH resource allocation.

In some cases, $$\left\lfloor \frac{r_{PUCCH}}{8} \right\rfloor = 0$$

and a parameter (e.g., pucch-ResourceCommon) may provide the UE 115 with a PUCCH resource and may not be provide frequency hopping information (e.g., useInterlace- PUCCHCommon-r16). In such cases, the UE 115 may determine the PRB index of the PUCCH transmission in the first hop as $$i_1 = RB_{BWP}^{offset} + \left[\frac{r_{PUCCH}}{N_{CS}}\right],$$

where $N_{CS}$ may represent the total number of initial cyclic shift indices, and the PRB index of the PUCCH transmission in the second hop as $N_{BWP}^{size}-i_1$.

In some cases, $$\left[\frac{r_{PUCCH}}{8}\right] = 1$$

and a parameter (e.g., pucch-ResourceCommon) may provide the UE 115 with a PUCCH resource and may not be provide frequency hopping information (e.g., useInterlace-PUCCHCommon-r16). In such cases, the UE 115 may determine the PRB index of the PUCCH transmission in the second hop as $$i_2 = RB_{BWP}^{offset} + \left[\frac{r_{PUCCH}-8}{N_{CS}}\right]$$

and the PRB index of the PUCCH transmission in the first hop as $N_{BWP}^{size}-i_2$. The UE 115 may determine the initial cyclic shift index in the set of initial cyclic shift indices as $(r_{PUCCH}-8) \bmod(N_{CS})$.

In some cases, a parameter (e.g., pucch-ResourceCommon) may provide the UE 115 with a PUCCH resource and frequency hopping information (e.g., useInterlacePUCCH-Common-r16). In such cases, the UE 115 may determine an interlace index m for the PUCCH resource, where $$m = \left(m_0 + \left[\frac{r_{PUCCH}}{N_{CS}}\right]\right) \bmod(M),$$

M may represent the number of interlaces, and $m_0=RB_{BWP}^{offset}$ may represent an interlace index offset with $RB_{BWP}^{offset}$ given in a PUCCH format table. The UE 115 may determine an initial cyclic shirt index in a set of initial cyclic shift indices as $r_{PUCCH} \bmod(N_{CS})$.

A parameter (e.g., pucch-ResourceCommon) may provide the UE 115 with a PUCCH resource. In some cases, a parameter may indicate an index 0, in which case the first symbol may be 9 for a PUCCH resource with PUCCH format 0 if $r_{PUCCH} \geq 10$. In some cases, a parameter may indicate an index 1 or 2, in which case the first symbol may be 9 for a PUCCH resource with PUCCH format 0 if $r_{PUCCH}=15$. In some cases, a parameter may indicate an index 3, 7, or 11, in which case an orthogonal cover code with an index 1 may be used for a PUCCH resource with PUCCH format 1 if $r_{PUCCH} \geq 10$. The UE 115 may not expect a parameter to indicate an index of 15.

In some cases, a base station 105 and a UE 115 in the wireless communications may utilize semi-persistent resources (e.g., semi-persistent resource occasions) for communications in the downlink (e.g., SPS resources) and the uplink (e.g., CG resources). Such resources are may be RRC configured for the UE 115 by the base station 105. For example, the UE 115 may be configured with SPS resources for downlink transmissions from the base station 105, and in some cases, the base station 105 may transmit DCI over SPS-PDSCH resources to reduce signaling overhead. This may benefit reduced capability devices that use uplink signaling (e.g., surveillance cameras, industrial wireless sensors) or have low complexity with low power requirements (e.g., smartwatches, medical wearables). In some cases, a network may transmit DCI on a PDCCH CORESET that contains information to schedule a PDSCH or release an SPS-PDSCH. The network may support implicitly allocating PUCCH resources for HARQ feedback based on parameters of the DCI in the CORESET, such as to provide HARQ feedback for the PDSCH. In some cases, the parameters of the DCI in the CORESET, such as the indices of CCEs used, may implicitly indicate the resources allocated for PUCCH. SPS-PDSCH resources do not use the same configurations for resources, such as CCEs or CORESETs, and therefore implicit PUCCH allocation is not supported for SPS-PDSCH DCI in current systems.

In some cases, a UE 115 may identify parameters of the PUCCH resource set using the parameters of the DCI multiplexed with PDSCH over an SPS occasion. For example, a combination of parameters of the DCI transmitted on SPS-PDSCH, such as frequency parameters, time parameters, spatial parameters, or other parameters, may implicitly indicate an allocated PUCCH resource set for the UE 115. The frequency parameters may include a starting RB or starting RE or a length of the DCI in frequency, the time parameters may include a starting symbol or a length of the DCI in time, and the spatial parameters may include the antennas used for transmission of the DCI, among others. In some cases, the UE 115 may calculate an index to a table of PUCCH resource sets using a combination of the parameters (e.g., frequency parameters, time parameters, spatial parameters, other parameters) of the SPS-PDSCH DCI. In some cases, the table may support a many-to-one mapping, such that multiple different combinations of parameters map to the same uplink control channel resource set. In some cases, the uplink control channel resource set may provide sufficient resources for an uplink control message to be transmitted by the UE 115. For example, the table may include multiple different sizes and configurations of PUCCH resource sets. In some cases, there may be different PUCCH resource sets with sizes to accommodate the UE 115 sending the uplink control message including HARQ ACK/NACK information, a CSI report, a scheduling request, or any combination thereof.

Figure 2:
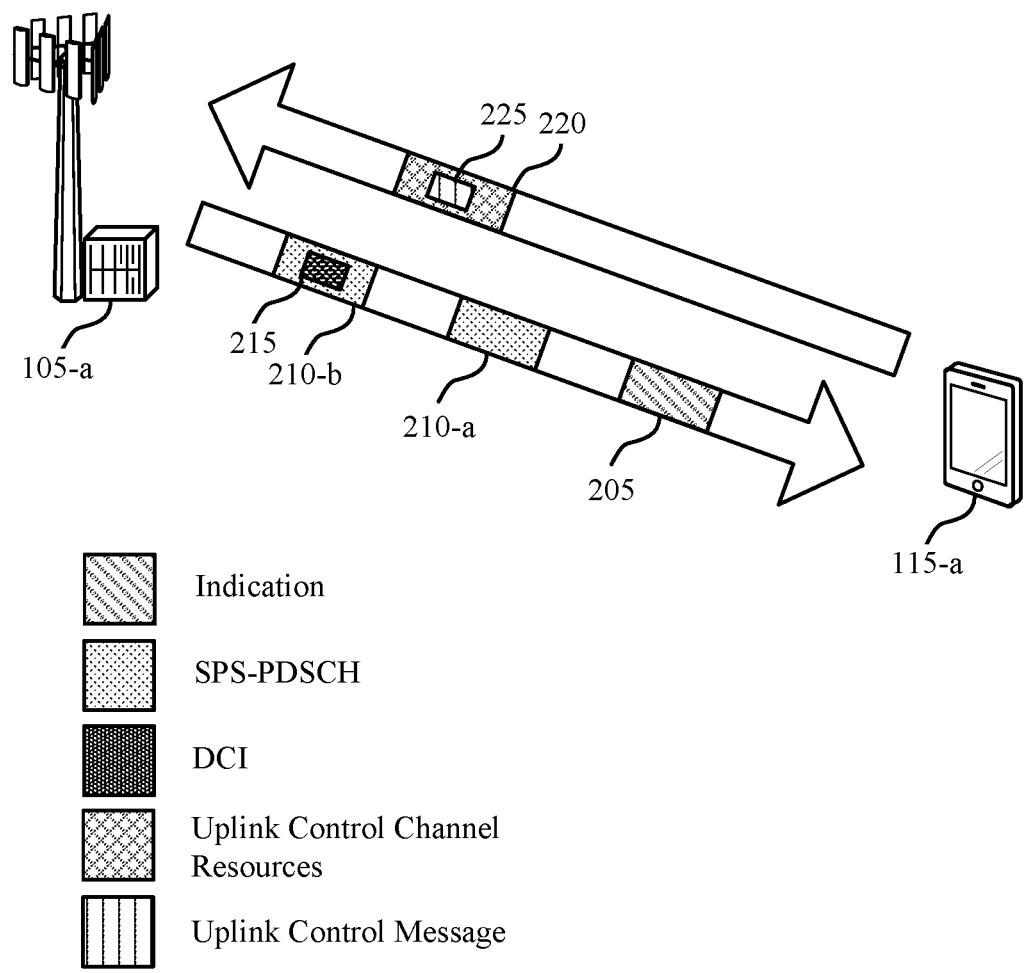
FIG. 2 illustrates an example of a wireless communications system that supports implicit uplink control channel resource allocation in accordance with aspects of the present disclosure.

FIG. 2 illustrates an example of a wireless communications system 200 that supports implicit uplink control channel resource allocation in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a, and a base station 105-a. The base station 105 and the UE 115 may be examples of corresponding devices described herein with reference to FIG. 1.

In some examples, the base station 105-a and the UE 115-a may communicate via uplink channels and downlink channels and may utilize semi-persistent resources (e.g., semi-persistent resource occasions) for downlink communications (e.g., SPS resources) and uplink communications (CG resources). The base station 105-a may configure (e.g., using RRC signaling) semi-periodic resources for the UE 115-a. For example, the base station 105-a may configure SPS-PDSCH resources for communications with the UE 115-*a*. For example, the SPS-PDSCH 210 may be scheduled at periodic occasions, such as the occasions carrying an SPS-PDSCH 210-*a* and an SPS-PDSCH 210-*b*.

In some cases, a base station 115-*a* may transmit a DCI 215 on an SPS-PDSCH resource, such as the SPS-PDSCH 210-*b*. The base station 105-*a* may transmit an indication 205 to the UE 115-*a* that SPS-PDSCH 210-*b* includes the DCI 215. In some cases, the indication 205 may be transmitted via control signaling, such as DCI. The UE 115-*a* may monitor the SPS-PDSCH 210-*b* for the DCI 215 based on receiving the indication 205.

The wireless communications system 200 may support techniques for indicating a PUCCH resource set based on parameters of a DCI transmitted on an SPS-PDSCH resource. In some cases, the indication may be implicit based on the parameters of the DCI, such as configurations or resources used to transmit the DCI (e.g., instead of explicit fields included in the DCI). Additionally, or alternatively, the DCI 215 may include one or more fields which may at least partially indicate a PUCCH resource set for the UE 115-*a*.

For example, the UE 115-*a* may identify one or more parameters of the DCI 215 on the SPS-PDSCH 210-*b*. In some cases, a combination of parameters of the DCI 215 on SPS-PDSCH 210-*b* may implicitly indicate an allocated PUCCH resource set 220 to the UE 115-*a*. The UE 115-*a* may use the PUCCH resource set 220 to send an uplink control message. For example, the UE 115-*a* may send feedback for data sent on the SPS-PDSCH 210 using the PUCCH resource set 220.

In some case, the UE 115-*a* may calculate an index to a table of PUCCH resource sets 220 by using a combination of the parameters of the DCI 215. The table of PUCCH resource sets may, for example, be a lookup table which may be indexed based on different combinations of parameters of the DCI 215. In some examples, the UE 115-*a* may determine or calculate the index based on a subset of the parameters of the DCI 215. In some cases, the table of PUCCH resource sets indexed based on a DCI 215 transmitted in an SPS-PDSCH 210 may be similar to or include some aspects of a table of PUCCH resource sets indexed based on a DCI sent on a PDCCH CORESET as described with reference to FIG. 1. In some cases, the table of PUCCH resource sets based on the SPS-PDSCH DCI may use the same table or a subset of the same table. In some other examples, the tables may be different. The UE 115-*a* may, in some cases, similarly determine an index to the table of PUCCH resource sets based on one or more parameters of the SPS-PDSCH DCI.

The parameters of the DCI 215 sent on the SPS-PDSCH 210 may include one or more parameters from one or more types of parameters, such as frequency parameters, time parameters, spatial parameters, or other parameters. For example, the frequency parameters may include a starting RB or starting RE, a length (e.g., in REs), a frequency interleaving pattern, and a frequency hopping pattern of the DCI 215. Time parameters may include a starting symbol, a length (e.g., in symbols), a time interleaving pattern, and a code used to transmit bits of the DCI 215. Spatial parameters may include a configured transmission configuration indicator (TCI) state and the antennas used for the DCI 215 transmissions on the SPS-PDSCH 210-*b*. Some other parameters may include a format, a location of allocated demodulation reference signal (DMRS) symbols, a radio network temporary identifier (RNTI) used to scramble a CRC of the DCI 215 (e.g., a type of RNTI or a value of the RNTI), and a cyclic shift used for bits of the DCI 215. Some example parameter combinations are described with reference to FIG. 3. In some cases, the calculation may be based on a field inside of the DCI 215 (e.g., a PUCCH-Resource-Indicator field).

In some cases, multiple different combinations of parameters of a DCI 215 sent on an SPS-PDSCH 210 may map to a same PUCCH resource allocation. For example, two different DCI 215 on SPS-PDSCH 210 may map to the same PUCCH resource allocation, such that parameters of DCI 215 on SPS-PDSCH 210 may map to the table of PUCCH resource sets 220 in a many-to-one manner. This may enable the UE 115-*a* to use the same PUCCH resource set configuration for different configurations of DCI 215.

In some examples, the parameters may correspond to PUCCH resource allocations based on a one-to-many mapping, where parameters of the DCI 215 on SPS-PDSCH 210 may map to multiple different PUCCH resource sets 220. The one-to-many mapping may allow the UE 115-*a* the flexibility to use any of these PUCCH resource sets 220 for a PUCCH transmission. Thus, the base station 105-*a* may implicitly indicate the UE 115-*a* to use existing parameters (e.g., from a past or present transmission) to select the PUCCH resource set 220 for PUCCH transmissions. For example, the UE 115-*a* may select the PUCCH resource set 220 from multiple options based on an active bandwidth part, a current TCI state, a current beam, or any combination thereof, to select an efficient PUCCH resource.

In some other examples, parameters of DCI 215 sent on SPS-PDSCH 210 may have a one-to-one mapping to the table of PUCCH resource sets. For example, in one-to-one mapping, a combination of parameters (e.g., frequency parameters, time parameters, spatial parameters, other parameters, or any combination thereof) of the DCI 215 on the SPS-PDSCH 210-*b* may map to one PUCCH resource set 220.

In some cases, the PUCCH resource set 220 may provide sufficient resources for an uplink control message 225 to be transmitted to the base station 105-*a* by the UE 115-*a*. The table of PUCCH resource sets may include multiple different sizes of PUCCH resource sets or PUCCH resource sets with different configurations. For example, there may be entries in the table for PUCCH resource sets in the table with different lengths in time (e.g., in symbols or slots), different lengths in frequencies (e.g., in resource elements or RBs), different orthogonal cover codes or coding configurations, different cyclic shift configurations, or any combination thereof. For example, the table may include different resources such that any combination of a HARQ feedback message, a CSI report, and a scheduling request can be sent on PUCCH using a resource set from the table. The UE 115-*a* may identify the resource set from the table as implicitly indicated by the DCI and transmit an uplink control message 225 to the base station 105-*a* using the PUCCH resource set 220. Thus, by configuring a UE 115-*a* to support implicit PUCCH resource indication, the UE 115-*a* may improve the reliability and latency of wireless communications by removing the need to explicitly indicate the resource allocation to the UE 115-*a* in bits. As a result, the UE 115-*a* may also reduce the amount of signaling overhead required, among other benefits.

Figure 3:
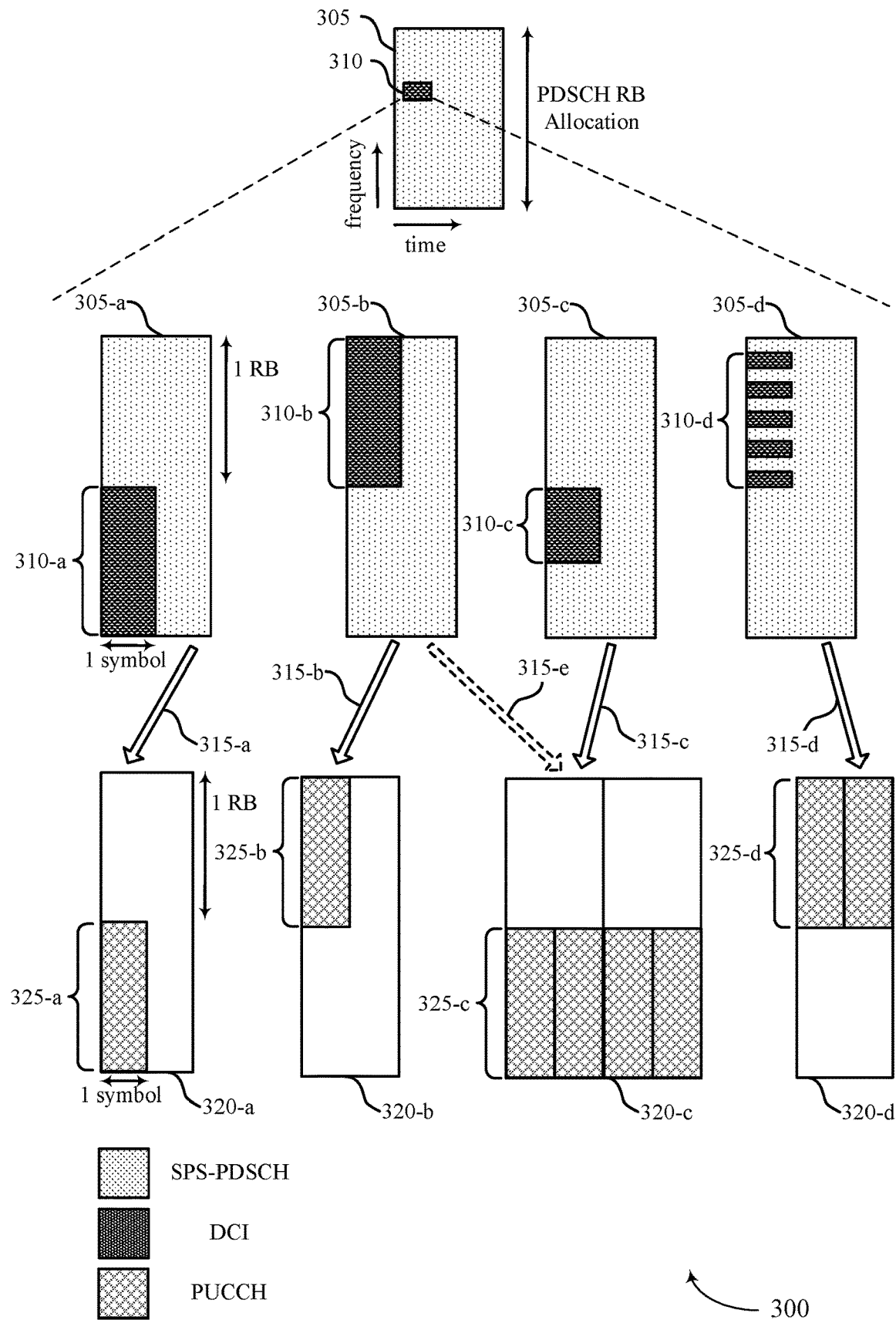
FIG. 3 illustrates an example of an uplink resource indication scheme that supports implicit uplink control channel resource allocation in accordance with aspects of the present disclosure.

FIG. 3 illustrates an example of an uplink resource indication scheme 300 that supports implicit uplink control channel resource allocation in accordance with aspects of the present disclosure. In some examples, the uplink resource indication scheme 300 may implement aspects of the wireless communication systems 100 and 200 or may be implemented by aspects of the wireless communications systems 100 and 200.

In some examples, a PUCCH resource set 325 may be implicitly indicated to a UE 115 based on parameters of a DCI 310 transmitted on an SPS-PDSCH resource, such as an SPS-PDSCH 305. The UE 115 may calculate parameters of the PUCCH resource set 325 by using one or more parameters of the DCI multiplexed with PDSCH over the SPS occasion. The SPS-PDSCH DCI parameters may include frequency parameters, time parameters, spatial parameters, or other types of parameters, or any combination thereof. In some cases, frequency parameters may include a starting RB or a starting resource element of the DCI 310 within the SPS-PDSCH 305, a length of the DCI 310 in frequency (e.g., in REs), a frequency interleaving pattern of the DCI 310, a frequency hopping pattern of the DCI 310, or any combination thereof. In some cases, time parameters may include a starting symbol of the DCI 310 in the SPS-PDSCH 305, a length of the DCI in time (e.g., in symbols), a time interleaving pattern of the DCI 310, a code used for DCI bits, or any combination thereof. In some cases, spatial parameters may include antennas used to transmit the DCI 310 on the SPS-PDSCH 305 or a TCI state configured for the DCI 310, or both.

The UE 115 may identify parameters for a PUCCH resource set 325 based on the parameters of the DCI 310 transmitted on SPS-PDSCH 305. For example, the UE 115 may identify a format, a starting PRB, a duration, a cyclic shift configuration, or any combination thereof, for the PUCCH resource set 325. For example, a PDSCH RB allocation may include a DCI 310 multiplexed with an SPS-PDSCH 305. DCI 310-a may occupy one symbol and one RB. The parameters of the DCI 310-a may implicitly indicate (e.g., via an implicit indication 315-a) the PUCCH resource set 325-a on a PUCCH 320-a. The UE may determine an index to a table of PUCCH resource sets using a combination of the parameters of the DCI 310-a on the SPS-PDSCH 305-a. For example, the SPS-PDSCH 305-a DCI 310-a may implicitly indicate a format 0 (e.g., corresponding to a PUCCH format), starting PRB of 0 (e.g., no offset), a length of 1 RB, a duration of 1 symbol, and a cyclic shift configuration of (0, 3, 6). Thus, the UE 115 may identify an implicitly indicated PUCCH resource set 325.

In a second example, a DCI 310-b may occupy one symbol and one RB. An offset for the DCI 310-b may be different than an offset for the DCI 310-a. The parameters of the DCI 310-b transmitted to the UE on the SPS-PDSCH 305-b may implicitly indicate (e.g., via an implicit indication 315-b) the PUCCH resource set 325-b on a PUCCH 320-b. The UE 115 may determine an index to a table of PUCCH resource sets using a combination of the parameters of the DCI 310-b on the SPS-PDSCH 305-b. For example, the SPS-PDSCH 305-b DCI 310-b may implicitly indicate a format of 0, a starting PRB of 1 (e.g., a PRB offset of 1), a length of 1 RB, a duration of 1 symbol, and a cyclic shift configuration of (0, 3, 6).

In a third example, a DCI 310-c may occupy one symbol and half of an RB (e.g., 6 REs). The parameters of the DCI 310-c transmitted to the UE 115 on the SPS-PDSCH 305-c may implicitly indicate (e.g., via an implicit indication 315-c) the PUCCH resource set 325-c on a PUCCH 320-c. The UE 115 may determine an index to a table of PUCCH resource sets using a combination of the parameters of the DCI 310-c sent on the SPS-PDSCH 305-c. For example, the DCI 310-c for SPS-PDSCH 305-c may implicitly indicate a format of 1, a starting PRB of 0, a length of 1 RB, a duration of 4 symbols, and a cyclic shift configuration of (0, 3, 6).

In a fourth example, a DCI 310-d may occupy one symbol and interleaved RBs (e.g., 6 REs). The parameters of the DCI 310-d transmitted to the UE on the SPS-PDSCH 305-d may implicitly indicate (e.g., via an implicit indication 315-d) the PUCCH resource set 325-d on a PUCCH 320-d. In some cases, the UE 115 may determine an index to a table of PUCCH resource sets using a combination of the parameters of the DCI 310-e sent on the SPS-PDSCH 305-d. For example, the SPS-PDSCH 305-d DCI 310-d may implicitly indicate a format of 0, a starting PRB of 1, a length of 1 RB, a duration of 2 symbols, and a cyclic shift configuration of (0, 3, 6).

In some cases, the table of PUCCH resource sets may support a many-to-one mapping, such that multiple different combinations of parameters of a DCI 310 on an SPS-PDSCH 305 to map to the same PUCCH resource set 325. For example, the parameters of DCI 310-b and the parameters of DCI 310-c may both point to the PUCCH resource set 325-c (e.g., via implicit indication 315-e and implicit indication 315-c, respectively). Therefore, multiple combinations of different DCI 310 may indicate, or map to, the same PUCCH resource set 325. In this example, the parameters of DCI 310-b may not indicate the PUCCH resource set 325-b. Thus, UE may support one-to-one and many-to-one mapping of parameters of DCI 310 of an SPS-PDSCH 305 to an index of a PUCCH resource set table.

Figure 4:
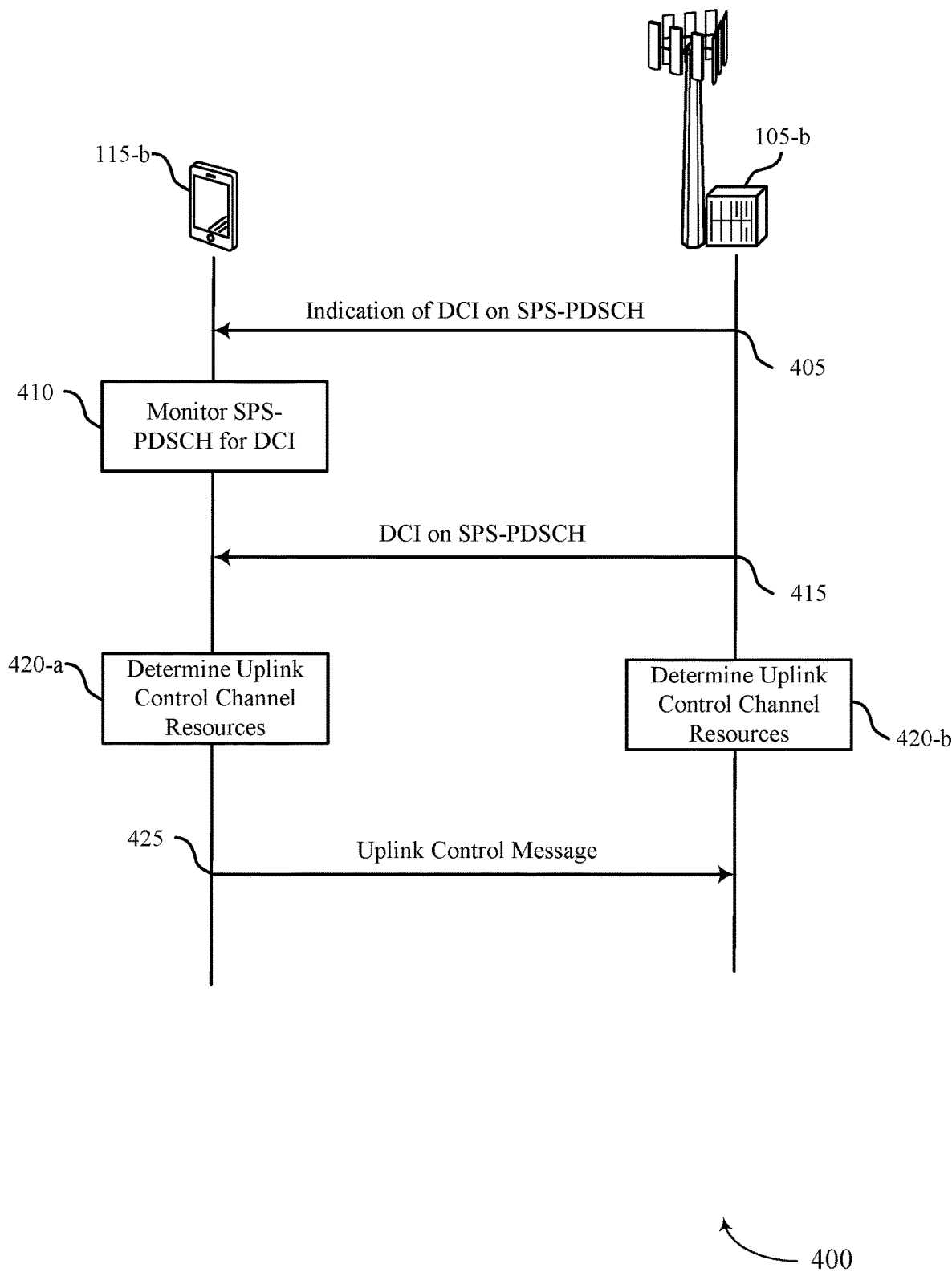
FIG. 4 illustrates an example of a process flow that supports implicit uplink control channel resource allocation in accordance with aspects of the present disclosure.

FIG. 4 illustrates an example of a process flow 400 that supports implicit uplink control channel resource allocation in accordance with aspects of the present disclosure. The process flow 400 may implement aspects of wireless communications systems 100 and 200, or may be implemented by aspects of the wireless communications system 100 and 200. The base station 105-b and the UE 115-b may be examples of a base station 105 and a UE 115, as described with reference to FIGS. 1 and 2. In the following description of the process flow 400, the operations between the base station 105-b and the UE 115-b may be transmitted in a different order than the example order shown, or the operations performed by the base station 105-b and the UE 115-b may be performed in different orders or at different times. Some operations may also be omitted from the process flow 400, and other operations may be added to the process flow 400.

At 405, a UE 115-b may receive, from a base station 105-b, an indication that a PDSCH resource in a scheduled occasion includes DCI. For example, the UE 115-b may receive, from the base station 105-b, a second DCI on a downlink control channel indicating that the SPS-PDSCH includes the DCI. In some cases, the PDSCH resource may be a non-SPS resource or an SPS resource (e.g., SPS-PDSCH). At 410, the UE 115-b may monitor SPS-PDSCH for the DCI based on the indication. For example, the UE 115-a may receive transmissions from the base station 105-a using SPS-PDSCH that include the DCI and may also receive transmissions that do not include the DCI.

At 415, the UE 115-b may receive the DCI on the SPS-PDSCH based on the indication that a PDSCH resource in a scheduled occasion includes DCI. In some cases, parameters of the DCI on the SPS-PDSCH may implicitly indicate a PUCCH resource set for the UE 115-b. At 420-a, the UE 115-b may determine a set of uplink control channel resources (e.g., a PUCCH resource set) based on one or more parameters of the DCI and the SPS-PDSCH. At 420-b, the base station 105-b may determine the PUCCH resource set based on the one or more parameters of the DCI and the SPS-PDSCH. The parameters may include frequency parameters, time parameters, spatial parameters, other parameters, or any combination thereof. In some cases, the PUCCH resource set may provide sufficient resources for the UE 115-*b* to transmit an uplink control message to the base station 105-*b*.

In some cases, the UE 115-*b* may calculate an index to a table of PUCCH resource sets using a combination of the parameters of the SPS-PDSCH DCI. In some cases, the parameters of the SPS-PDSCH DCI may map to an index of a table of PUCCH resource sets on a one-to-one or a one-to-many manner. The table of PUCCH resource sets may include multiple different uplink resources sets with different sizes or different configurations. For example, the table may include uplink control channel resource sets with varying time allocation sizes (e.g., in symbols or slots), frequency allocation sizes (e.g., in PRBs), cover code configurations (e.g., orthogonal cover code configurations), cyclic shift configurations, or any combination thereof.

At 430, the UE 115-*b* may transmit an uplink control message to the base station 105-*b* using the PUCCH resource set. For example, the uplink control message may include a HARQ ACK/NACK message, a CSI report, a scheduling request, or any combination thereof. The table may include different sets of PUCCH resources such that any combination of a HARQ feedback message, a CSI report, and a scheduling request can be transmitted on PUCCH using a resource set from the table.

Figure 5:
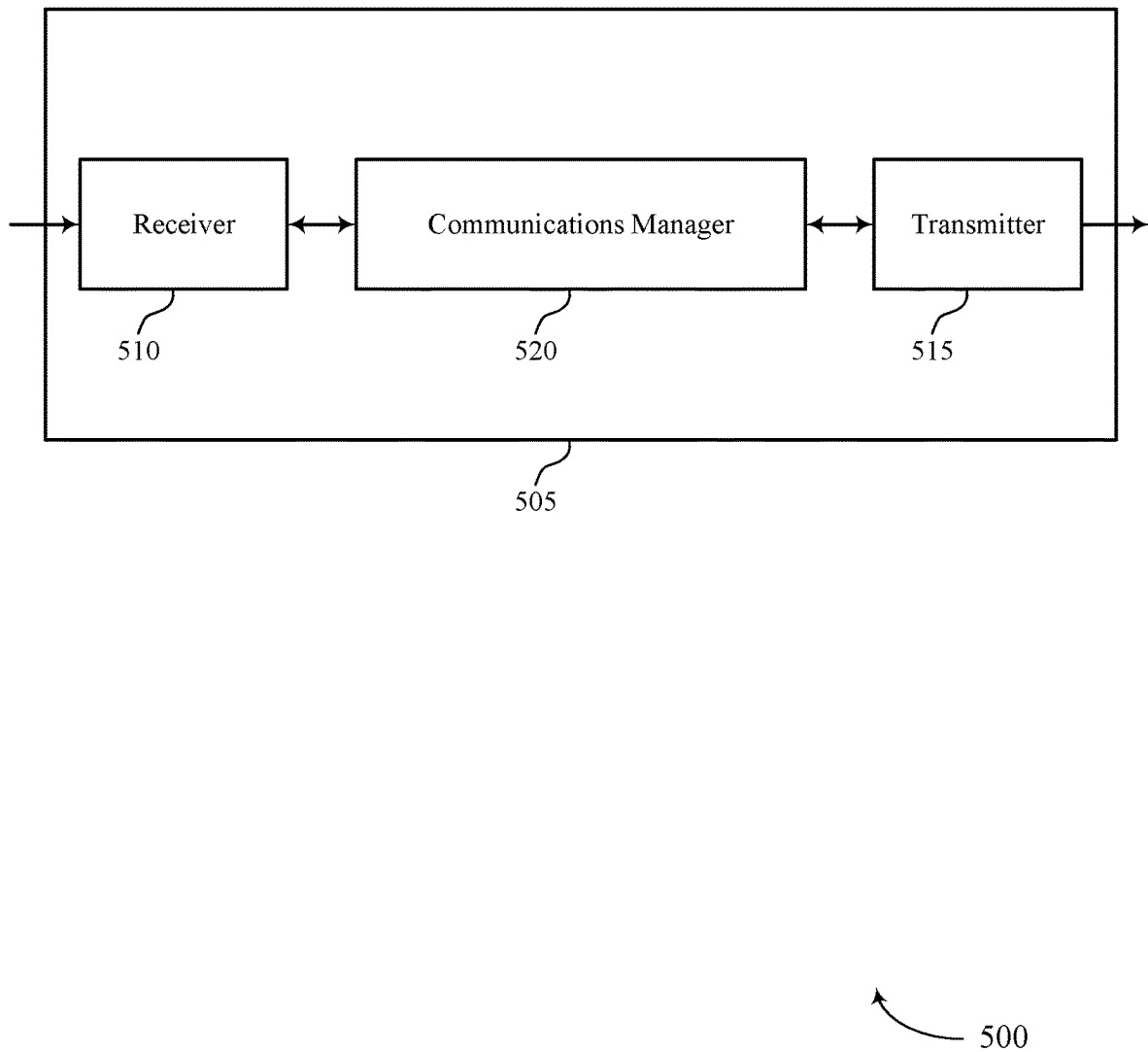
FIGS. 5 and 6 show block diagrams of devices that support implicit uplink control channel resource allocation in accordance with aspects of the present disclosure.

FIG. 5 shows a block diagram 500 of a device 505 that supports implicit uplink control channel resource allocation in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to implicit uplink control channel resource allocation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to implicit uplink control channel resource allocation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of implicit uplink control channel resource allocation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, an indication that a downlink shared channel resource in a scheduled occasion includes DCI. The communications manager 520 may be configured as or otherwise support a means for monitoring the downlink shared channel resource in the scheduled occasion for the DCI based on the indication. The communications manager 520 may be configured as or otherwise support a means for determining a set of uplink control channel resources based on one or more parameters of the DCI and the downlink shared channel resource. In some examples, the set of uplink control channel resources may be also based on information in the DCI. The communications manager 520 may be configured as or otherwise support a means for transmitting an uplink control message to the base station using the set of uplink control channel resources.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for implicit uplink control channel resource allocation which may improve reliability and resource efficiency, and decrease latency among other advantages. As such, supported techniques may include improved network operations and, in some examples, may promote network efficiencies, among other benefits.

Figure 6:
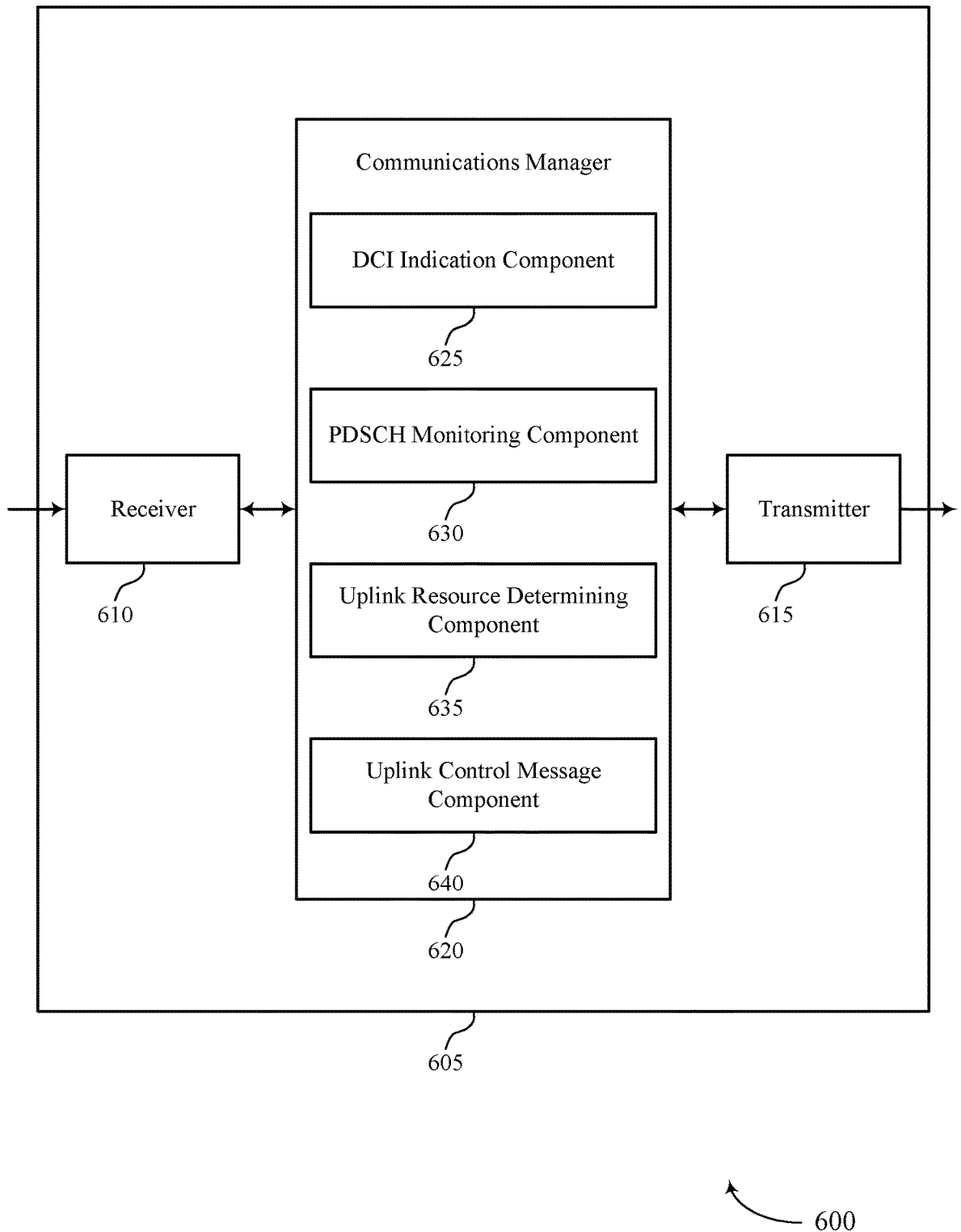

FIG. 6 shows a block diagram 600 of a device 605 that supports implicit uplink control channel resource allocation in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to implicit uplink control channel resource allocation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to implicit uplink control channel resource allocation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of implicit uplink control channel resource allocation as described herein. For example, the communications manager 620 may include a DCI indication component 625, a PDSCH monitoring component 630, an uplink resource determining component 635, an uplink control message component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The DCI indication component 625 may be configured as or otherwise support a means for receiving, from a base station, an indication that a downlink shared channel resource in a scheduled occasion includes DCI. The PDSCH monitoring component 630 may be configured as or otherwise support a means for monitoring the downlink shared channel resource in the scheduled occasion for the DCI based on the indication. The uplink resource determining component 635 may be configured as or otherwise support a means for determining a set of uplink control channel resources based on one or more parameters of the DCI and the downlink shared channel resource. The uplink control message component 640 may be configured as or otherwise support a means for transmitting an uplink control message to the base station using the set of uplink control channel resources.

Figure 7:
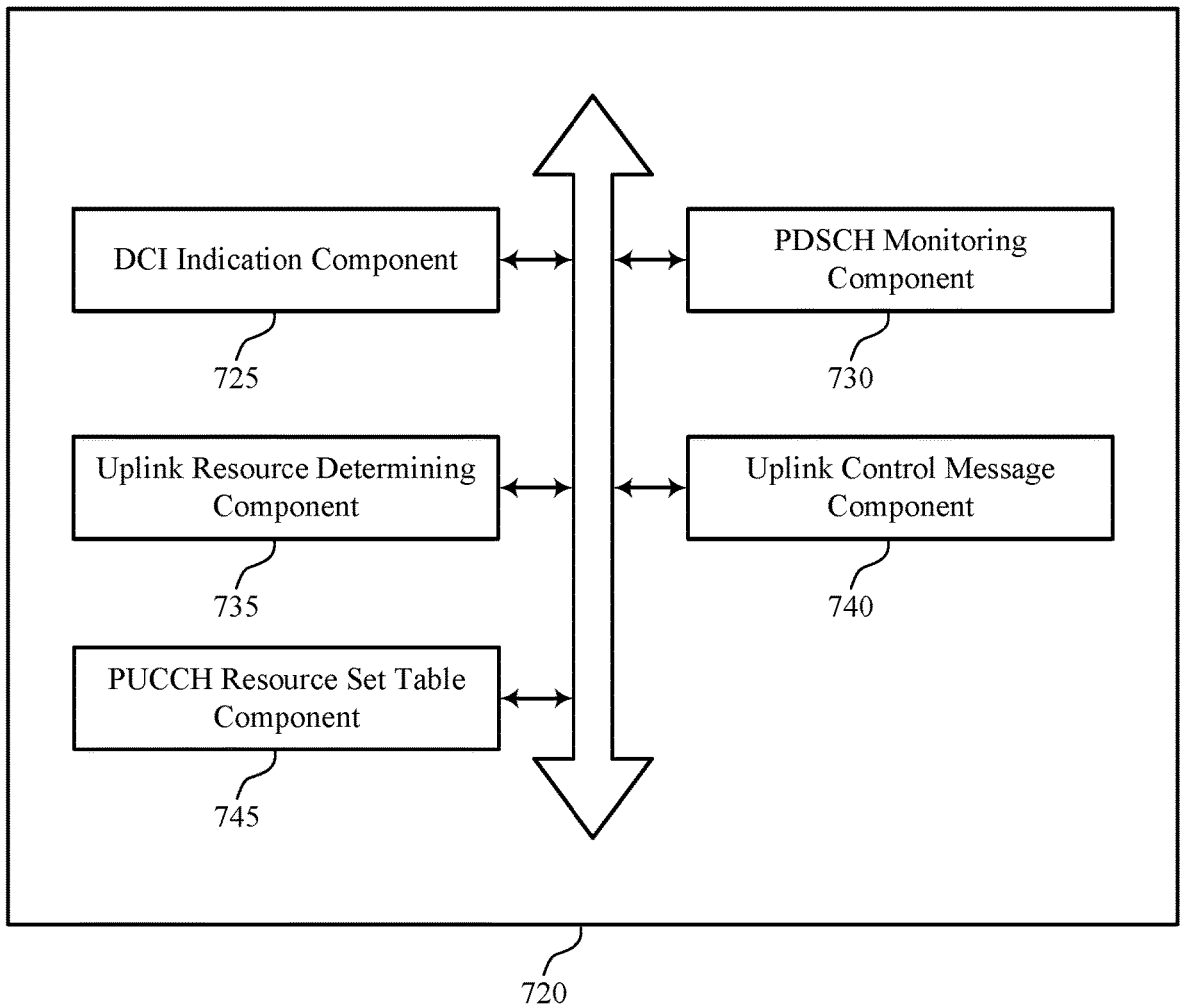
FIG. 7 shows a block diagram of a communications manager that supports implicit uplink control channel resource allocation in accordance with aspects of the present disclosure.

FIG. 7 shows a block diagram 700 of a communications manager 720 that supports implicit uplink control channel resource allocation in accordance with aspects of the present disclosure. The communications manager 720 may be an example of aspects of a communications manager 520, a communications manager 620, or both, as described herein. The communications manager 720, or various components thereof, may be an example of means for performing various aspects of implicit uplink control channel resource allocation as described herein. For example, the communications manager 720 may include DCI indication component 725, a PDSCH monitoring component 730, an uplink resource determining component 735, an uplink control message component 740, a PUCCH resource set table component 745, or any combination thereof. Each of these components may communicate, directly or indirectly, with one another (e.g., via one or more buses).

The communications manager 720 may support wireless communications at a UE in accordance with examples as disclosed herein. The DCI indication component 725 may be configured as or otherwise support a means for receiving, from a base station, an indication that a downlink shared channel resource in a scheduled occasion includes DCI. The PDSCH monitoring component 730 may be configured as or otherwise support a means for monitoring the downlink shared channel resource in the scheduled occasion for the DCI based on the indication. The uplink resource determining component 735 may be configured as or otherwise support a means for determining a set of uplink control channel resources based on one or more parameters of the DCI and the downlink shared channel resource. The uplink control message component 740 may be configured as or otherwise support a means for transmitting an uplink control message to the base station using the set of uplink control channel resources.

In some examples, to support determining the set of uplink control channel resources, the PUCCH resource set table component 745 may be configured as or otherwise support a means for determining an index of a table of uplink control channel resource sets based on the one or more parameters of the DCI. In some examples, to support determining the set of uplink control channel resources, the PUCCH resource set table component 745 may be configured as or otherwise support a means for selecting the set of uplink control channel resources from the table of uplink control channel resource sets based on the index.

In some examples, the table of uplink control channel resource sets includes a set of multiple uplink control channel resources with a set of multiple sizes based on a length in time, a length in frequency, cyclic shift information, cover code information, or any combination thereof.

In some examples, to support determining the set of uplink control channel resources, the uplink resource determining component 735 may be configured as or otherwise support a means for identifying a field of the DCI, the field indicating the set of uplink control channel resources, where the set of uplink control channel resources are identified based on the field indicating the set of uplink control channel resources.

In some examples, the one or more parameters of the DCI on the downlink shared channel resource implicitly indicate the set of uplink control channel resources.

In some examples, to support determining the set of uplink control channel resources, the uplink resource determining component 735 may be configured as or otherwise support a means for identifying one or more frequency parameters, one or more time parameters, one or more space parameters, or any combination thereof of the one or more parameters of the DCI, where the set of uplink control channel resources is based on the one or more frequency parameters, one or more time parameters, one or more space parameters, or any combination thereof.

In some examples, the one or more frequency parameters include a starting resource block or a starting resource element of the DCI within the downlink shared channel resource, a length of the DCI in frequency, a frequency interleaving pattern of the DCI, a frequency hopping pattern of the DCI, or any combination thereof.

In some examples, the one or more time parameters include a starting symbol of the DCI in the downlink shared channel resource, a length of the DCI in time, a time interleaving pattern of the DCI, a code used for DCI bits, or any combination thereof. In some examples, the one or more space parameters include antennas used for transmission of the DCI on the downlink shared channel resource or a TCI state configured for the DCI, or both.

In some examples, the one or more parameters include a format of the DCI, a location of demodulation reference signal symbols allocated to the DCI within the downlink shared channel resource, an RNTI used to scramble a cyclic redundancy check of the DCI, a cyclic shift used for bits of the DCI, or any combination thereof.

In some examples, a set of multiple different sets of parameters for the DCI transmitted on the downlink shared channel resource correspond to the set of uplink control channel resources. In some examples, the control message includes an HARQ feedback, a CSI report, a scheduling request, or any combination thereof.

In some examples, to support receiving the indication that the downlink shared channel resource in the scheduled occasion includes the DCI, the DCI indication component 725 may be configured as or otherwise support a means for receiving a second DCI on a downlink control channel indicating that the downlink shared channel resource includes the DCI.

Figure 8:
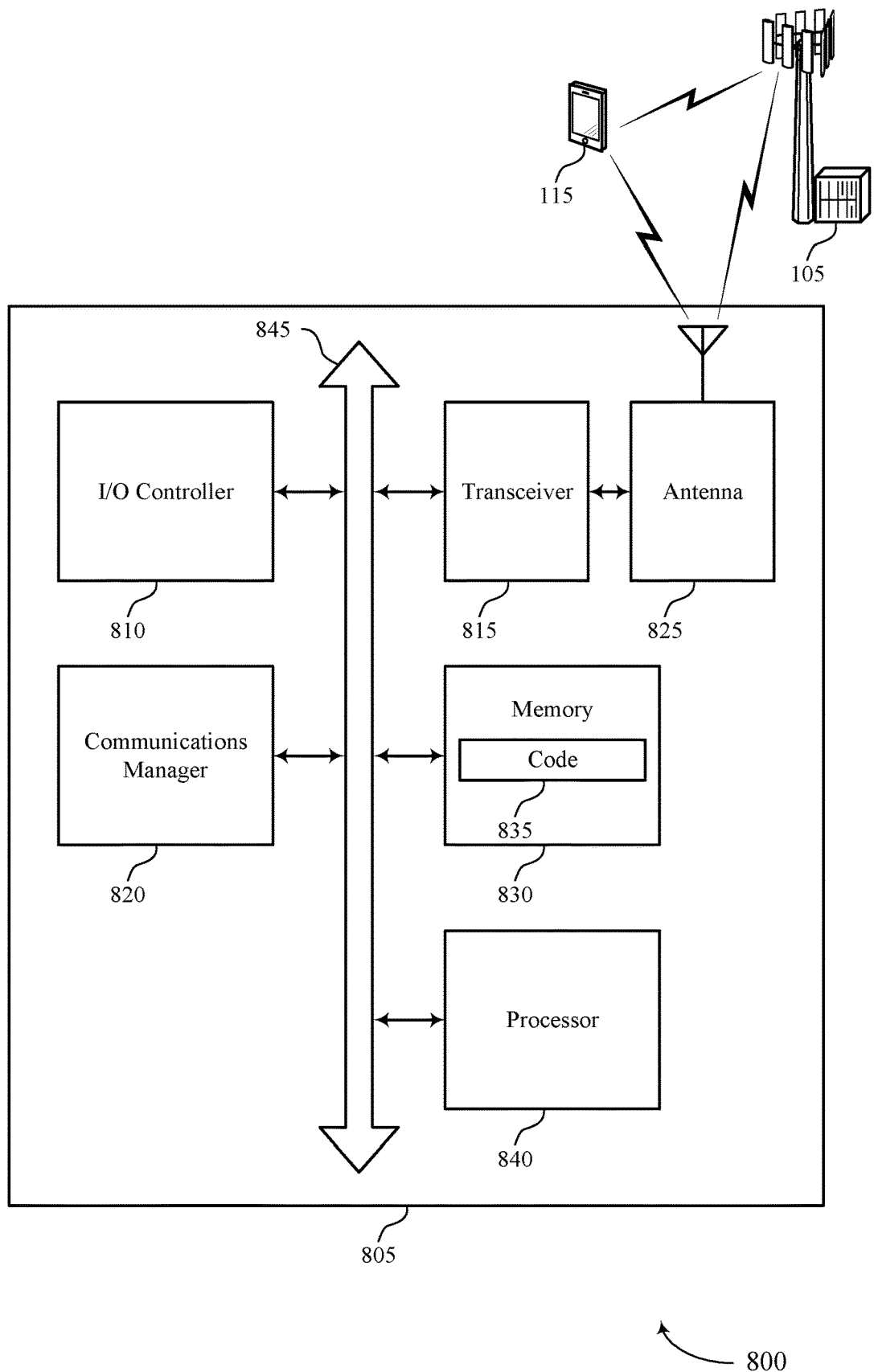
FIG. 8 shows a diagram of a system including a device that supports implicit uplink control channel resource allocation in accordance with aspects of the present disclosure.

FIG. 8 shows a diagram of a system 800 including a device 805 that supports implicit uplink control channel resource allocation in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting implicit uplink control channel resource allocation). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, an indication that a downlink shared channel resource in a scheduled occasion includes DCI. The communications manager 820 may be configured as or otherwise support a means for monitoring the downlink shared channel resource in the scheduled occasion for the DCI based on the indication. The communications manager 820 may be configured as or otherwise support a means for determining a set of uplink control channel resources based on one or more parameters of the DCI and the downlink shared channel resource. The communications manager 820 may be configured as or otherwise support a means for transmitting an uplink control message to the base station using the set of uplink control channel resources.

By including or configuring the communications manager 820 in accordance with examples as described herein, the device 805 may support techniques for implicit uplink control channel resource allocation which may improve reliability and resource efficiency, and decrease latency among other advantages. As such, supported techniques may include improved network operations and, in some examples, may promote network efficiencies, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of implicit uplink control channel resource allocation as described herein, or the processor 840 and the memory 830 may be otherwise configured to perform or support such operations.

Figure 9:
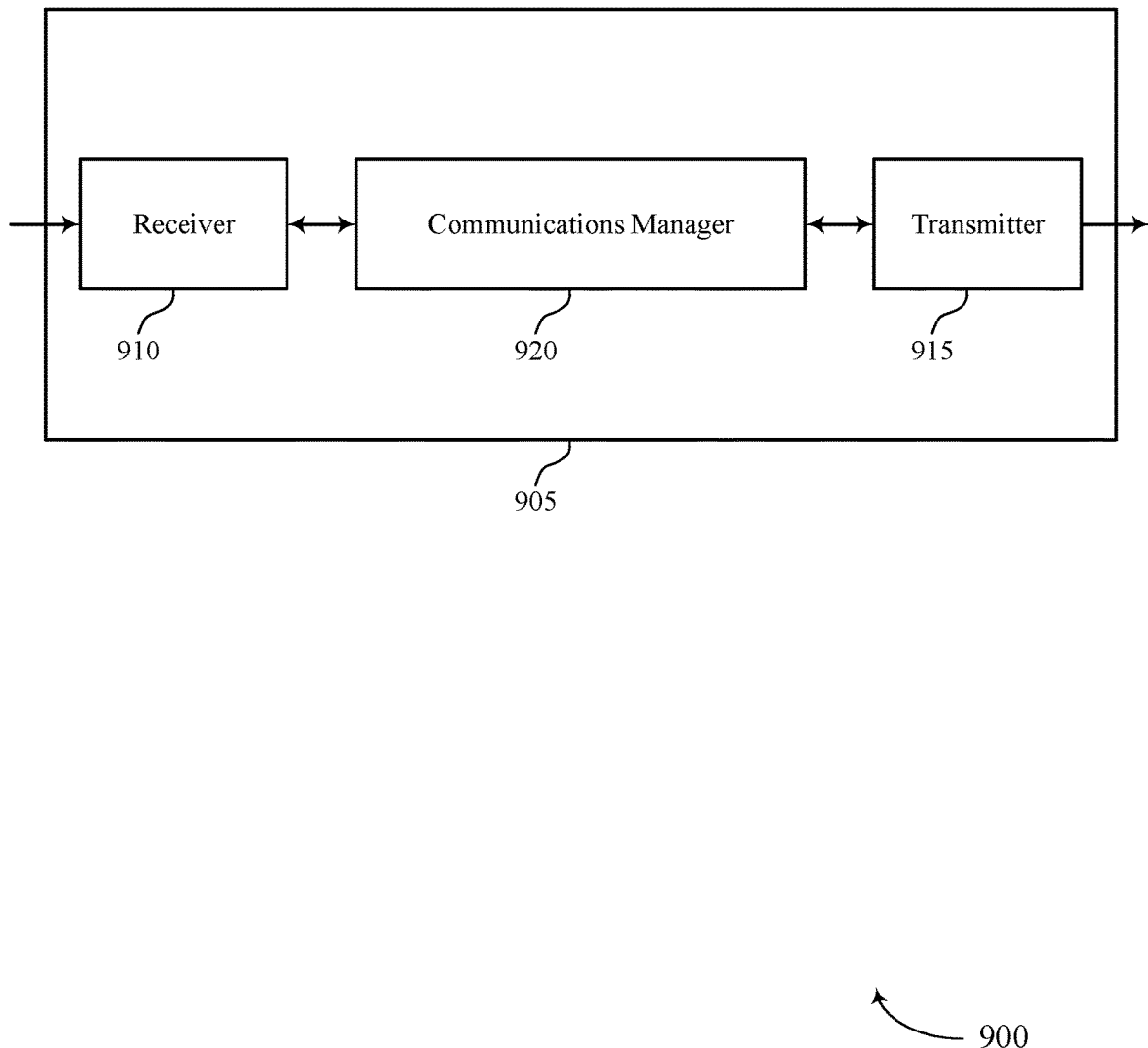
FIGS. 9 and 10 show block diagrams of devices that support implicit uplink control channel resource allocation in accordance with aspects of the present disclosure.

FIG. 9 shows a block diagram 900 of a device 905 that supports implicit uplink control channel resource allocation in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to implicit uplink control channel resource allocation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to implicit uplink control channel resource allocation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of implicit uplink control channel resource allocation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, an indication that a downlink shared channel resource in a scheduled occasion includes DCI. The communications manager 920 may be configured as or otherwise support a means for transmitting the DCI on the downlink shared channel resource based on the indication. The communications manager 920 may be configured as or otherwise support a means for determining a set of uplink control channel resources based on one or more parameters of the DCI and the downlink shared channel resource. The communications manager 920 may be configured as or otherwise support a means for receiving an uplink control message from the UE on the set of uplink control channel resources.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for implicit uplink control channel resource allocation which may improve reliability and resource efficiency, and decrease latency among other advantages. As such, supported techniques may include improved network operations and, in some examples, may promote network efficiencies, among other benefits.

Figure 10:
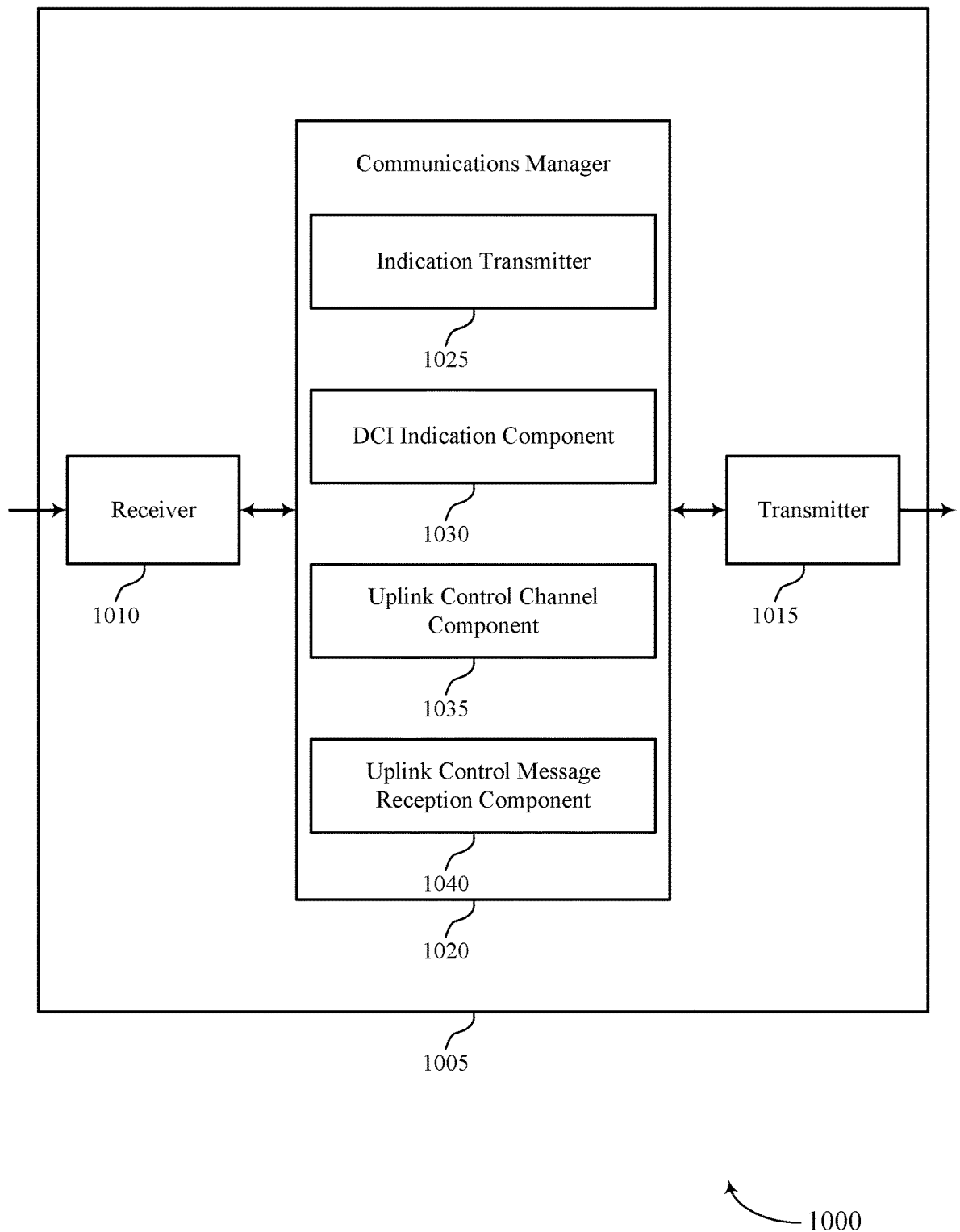

FIG. 10 shows a block diagram 1000 of a device 1005 that supports implicit uplink control channel resource allocation in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to implicit uplink control channel resource allocation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to implicit uplink control channel resource allocation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of implicit uplink control channel resource allocation as described herein. For example, the communications manager 1020 may include a DCI indication component 1025, a DCI component 1030, an uplink control channel component 1035, an uplink control message reception component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The DCI indication component 1025 may be configured as or otherwise support a means for transmitting, to a UE, an indication that a downlink shared channel resource in a scheduled occasion includes DCI.

The DCI component 1030 may be configured as or otherwise support a means for transmitting the DCI on the downlink shared channel resource based on the indication. The uplink control channel component 1035 may be configured as or otherwise support a means for determining a set of uplink control channel resources based on one or more parameters of the DCI and the downlink shared channel resource. The uplink control message reception component 1040 may be configured as or otherwise support a means for receiving an uplink control message from the UE on the set of uplink control channel resources.

Figure 11:
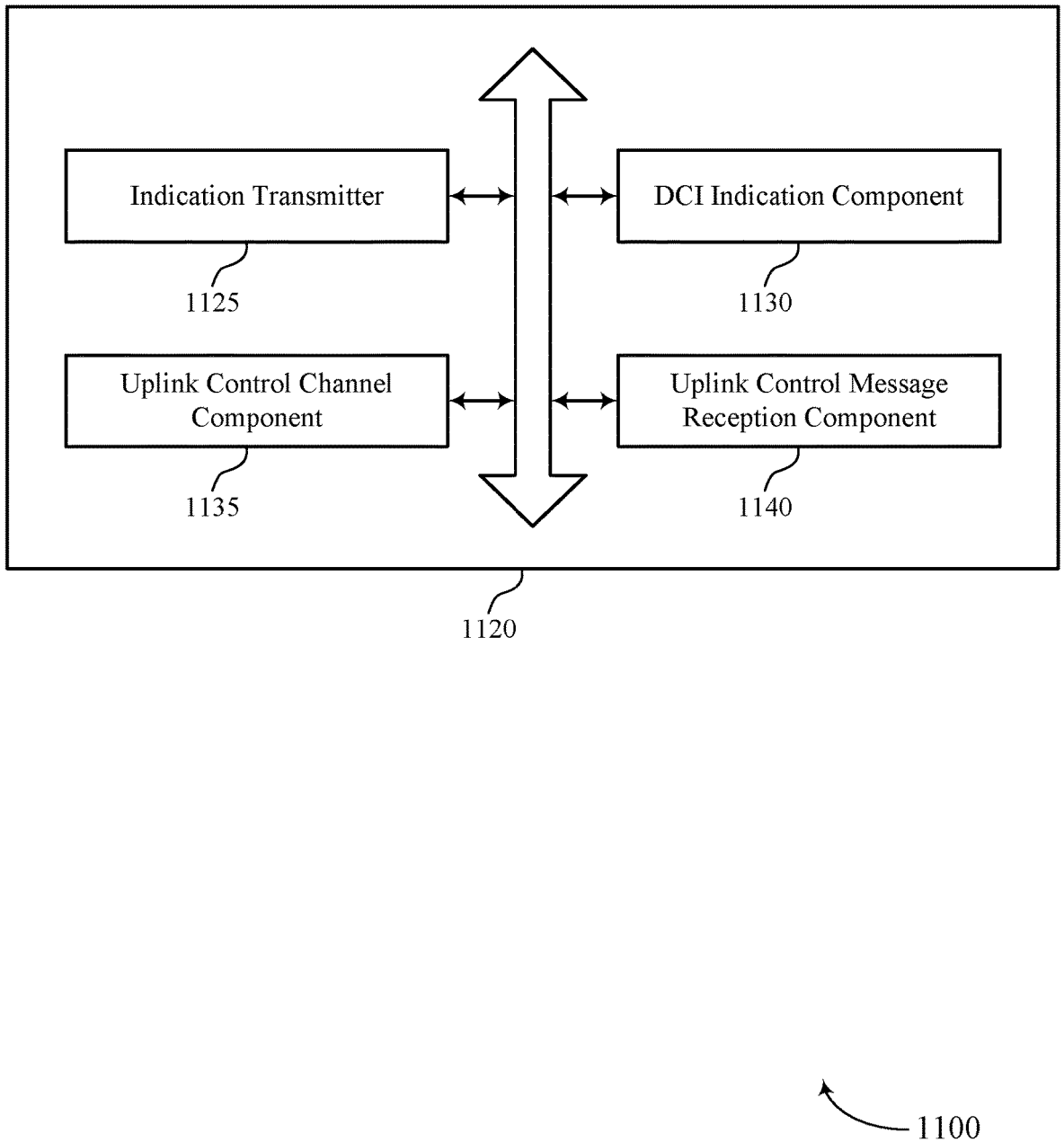
FIG. 11 shows a block diagram of a communications manager that supports implicit uplink control channel resource allocation in accordance with aspects of the present disclosure.

FIG. 11 shows a block diagram 1100 of a communications manager 1120 that supports implicit uplink control channel resource allocation in accordance with aspects of the present disclosure. The communications manager 1120 may be an example of aspects of a communications manager 920, a communications manager 1020, or both, as described herein. The communications manager 1120, or various components thereof, may be an example of means for performing various aspects of implicit uplink control channel resource allocation as described herein. For example, the communications manager 1120 may include a DCI indication component 1125, a DCI component 1130, an uplink control channel component 1135, an uplink control message reception component 1140, or any combination thereof. Each of these components may communicate, directly or indirectly, with one another (e.g., via one or more buses).

The communications manager 1120 may support wireless communications at a base station in accordance with examples as disclosed herein. The DCI indication component 1125 may be configured as or otherwise support a means for transmitting, to a UE, an indication that a downlink shared channel resource in a scheduled occasion includes DCI. The DCI component 1130 may be configured as or otherwise support a means for transmitting the DCI on the downlink shared channel resource based on the indication. The uplink control channel component 1135 may be configured as or otherwise support a means for determining a set of uplink control channel resources based on one or more parameters of the DCI and the downlink shared channel resource. The uplink control message reception component 1140 may be configured as or otherwise support a means for receiving an uplink control message from the UE on the set of uplink control channel resources.

In some examples, to support determining the set of uplink control channel resources, the uplink control channel component 1135 may be configured as or otherwise support a means for determining an index of a table of uplink control channel resource sets based on the one or more parameters of the DCI. In some examples, to support determining the set of uplink control channel resources, the uplink control channel component 1135 may be configured as or otherwise support a means for selecting the set of uplink control channel resources from the table of uplink control channel resource sets based on the index.

In some examples, to support determining the set of uplink control channel resources, the uplink control channel component 1135 may be configured as or otherwise support a means for identifying a field of the DCI, the field indicating the set of uplink control channel resources, where the set of uplink control channel resources are identified based on the field indicating the set of uplink control channel resources.

In some examples, the one or more parameters of the DCI on the downlink shared channel resource implicitly indicate the set of uplink control channel resources.

In some examples, to support determining the set of uplink control channel resources, the uplink control channel component 1135 may be configured as or otherwise support a means for identifying one or more frequency parameters, one or more time parameters, one or more space parameters, or any combination thereof of the one or more parameters of the DCI, where the set of uplink control channel resources is based on the one or more frequency parameters, one or more time parameters, one or more space parameters, or any combination thereof.

In some examples, the one or more frequency parameters include a starting resource block or a starting resource element of the DCI within the downlink shared channel resource, a length of the DCI in frequency, a frequency interleaving pattern of the DCI, a frequency hopping pattern of the DCI, or any combination thereof.

In some examples, the one or more time parameters include a starting symbol of the DCI in the downlink shared channel resource, a length of the DCI in time, a time interleaving pattern of the DCI, a code used for DCI bits, or any combination thereof.

In some examples, the one or more space parameters include antennas used to transmit the DCI on the downlink shared channel resource or a TCI state configured for the DCI, or both.

In some examples, the one or more parameters include a format of the DCI, a location of demodulation reference signal symbols allocated to the DCI within the downlink shared channel resource, an RNTI used to scramble a cyclic redundancy check of the DCI, a cyclic shift used for bits of the DCI, or any combination thereof.

In some examples, a set of multiple different sets of parameters for the DCI transmitted on the downlink shared channel resource correspond to the set of uplink control channel resources.

In some examples, to support receiving the uplink control message, the uplink control message reception component 1140 may be configured as or otherwise support a means for receiving an HARQ feedback message, a CSI report, a scheduling request, or any combination thereof.

In some examples, to support transmitting the indication that the downlink shared channel resource in the scheduled occasion includes the DCI, the DCI indication component 1125 may be configured as or otherwise support a means for transmitting a second DCI on a downlink control channel indicating that the downlink shared channel resource includes the DCI.

Figure 12:
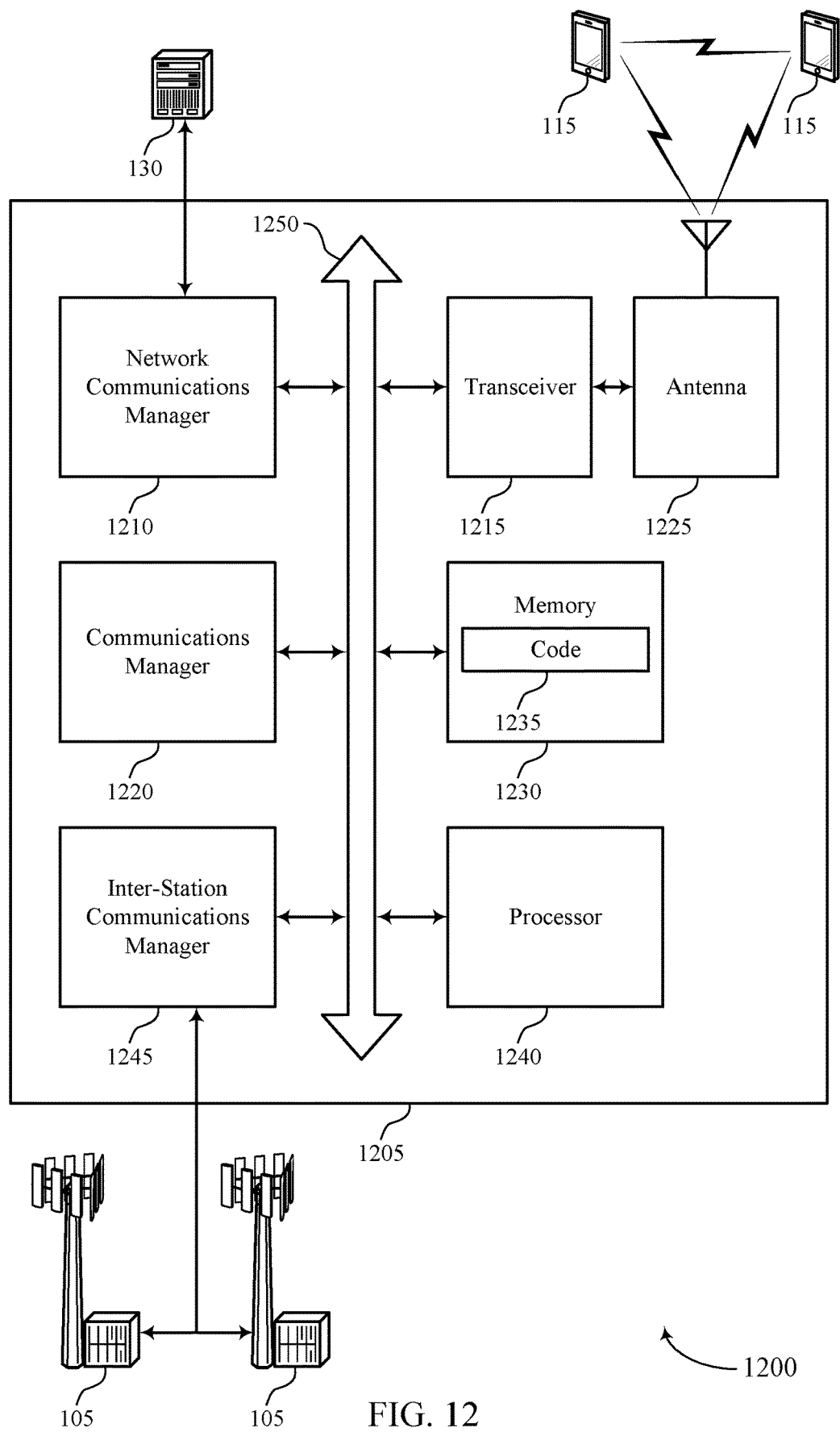
FIG. 12 shows a diagram of a system including a device that supports implicit uplink control channel resource allocation in accordance with aspects of the present disclosure.

FIG. 12 shows a diagram of a system 1200 including a device 1205 that supports implicit uplink control channel resource allocation in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting implicit uplink control channel resource allocation). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, an indication that a downlink shared channel resource in a scheduled occasion includes DCI. The communications manager 1220 may be configured as or otherwise support a means for transmitting the DCI on the downlink shared channel resource based on the indication. The communications manager 1220 may be configured as or otherwise support a means for determining a set of uplink control channel resources based on one or more parameters of the DCI and the downlink shared channel resource. The communications manager 1220 may be configured as or otherwise support a means for receiving an uplink control message from the UE on the set of uplink control channel resources.

By including or configuring the communications manager 1220 in accordance with examples as described herein, the device 1205 may support techniques for implicit uplink control channel resource allocation which may improve reliability and resource efficiency, and decrease latency among other advantages. As such, supported techniques may include improved network operations and, in some examples, may promote network efficiencies, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of implicit uplink control channel resource allocation as described herein, or the processor 1240 and the memory 1230 may be otherwise configured to perform or support such operations.

Figure 13:
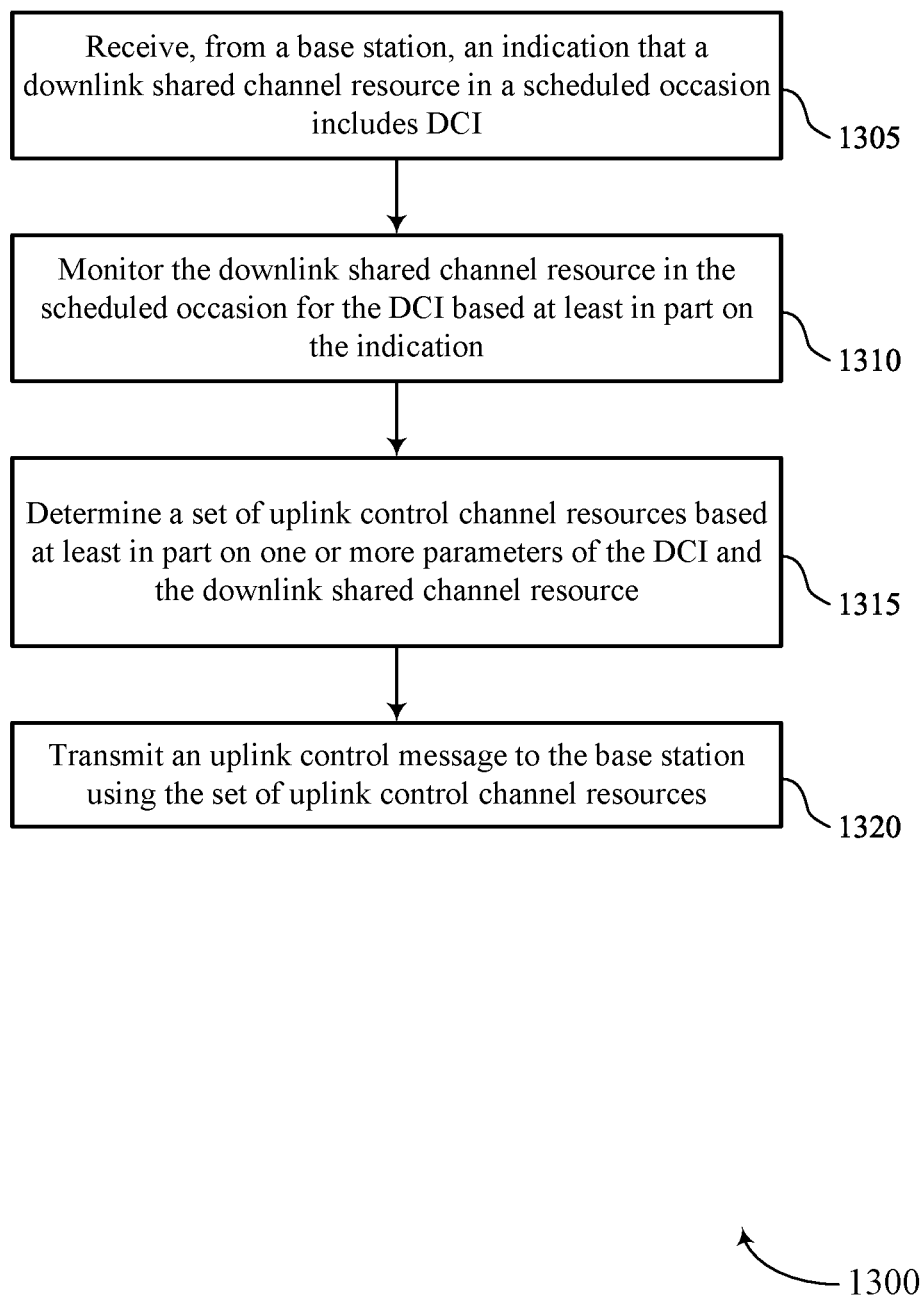
FIGS. 13 through 17 show flowcharts illustrating methods that support implicit uplink control channel resource allocation in accordance with aspects of the present disclosure.

FIG. 13 shows a flowchart illustrating a method 1300 that supports implicit uplink control channel resource allocation in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, an indication that a downlink shared channel resource in a scheduled occasion includes DCI. The operations of 1305 may be performed in accordance with examples as disclosed herein. In some examples, aspects of the operations of 1305 may be performed by a DCI indication component 725 as described with reference to FIG. 7.

At 1310, the method may include monitoring the downlink shared channel resource in the scheduled occasion for the DCI based on the indication. The operations of 1310 may be performed in accordance with examples as disclosed herein. In some examples, aspects of the operations of 1310 may be performed by a PDSCH monitoring component 730 as described with reference to FIG. 7.

At 1315, the method may include determining a set of uplink control channel resources based on one or more parameters of the DCI and the downlink shared channel resource. In some examples, the set of uplink control channel resources may be also based on information in the DCI, such as a field in the DCI. The operations of 1315 may be performed in accordance with examples as disclosed herein. In some examples, aspects of the operations of 1315 may be performed by an uplink resource determining component 735 as described with reference to FIG. 7.

At 1320, the method may include transmitting an uplink control message to the base station using the set of uplink control channel resources. The operations of 1320 may be performed in accordance with examples as disclosed herein. In some examples, aspects of the operations of 1320 may be performed by an uplink control message component 740 as described with reference to FIG. 7.

Figure 14:
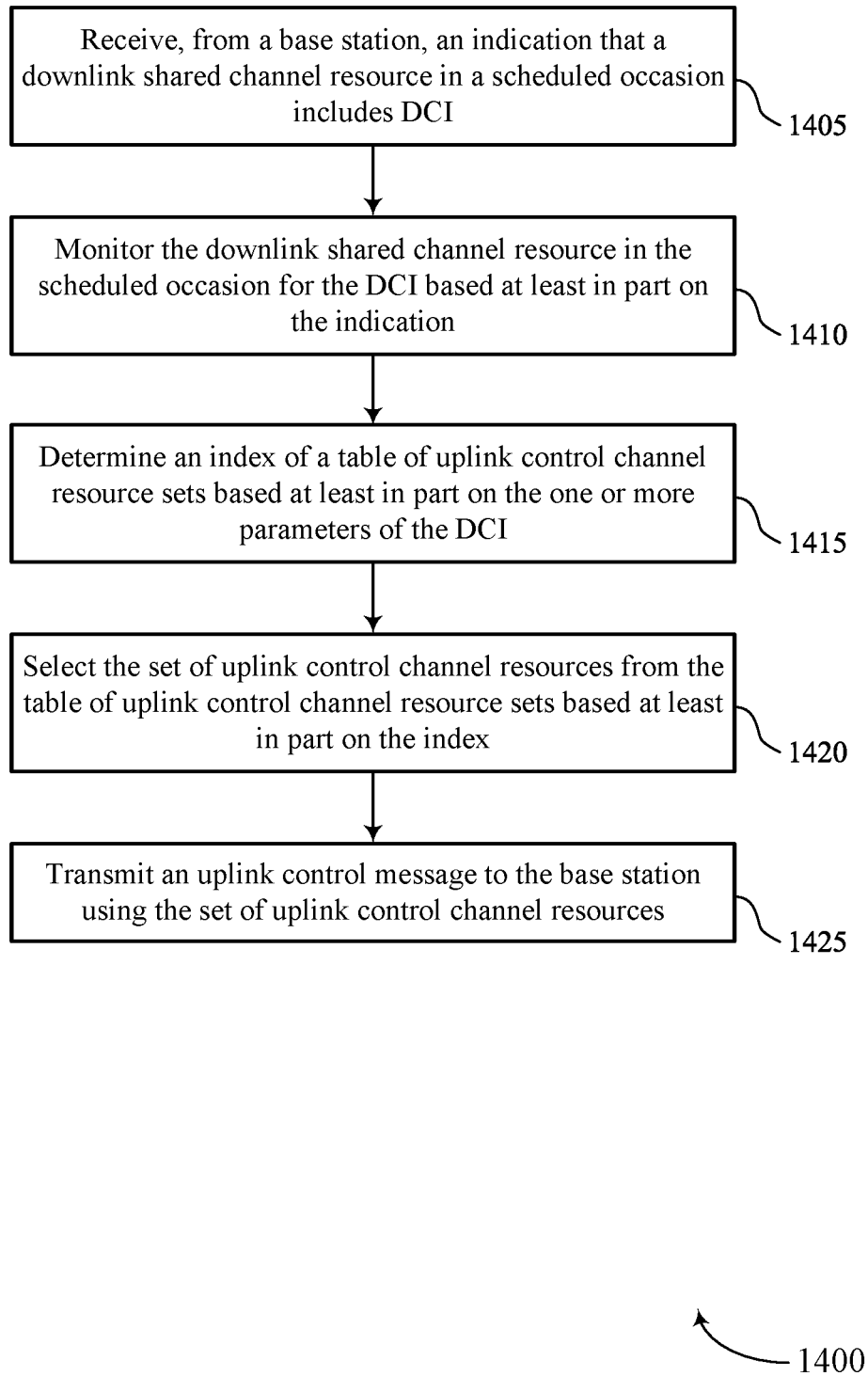

FIG. 14 shows a flowchart illustrating a method 1400 that supports implicit uplink control channel resource allocation in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an indication that a downlink shared channel resource in a scheduled occasion includes DCI. The operations of 1405 may be performed in accordance with examples as disclosed herein. In some examples, aspects of the operations of 1405 may be performed by DCI indication component 725 as described with reference to FIG. 7.

At 1410, the method may include monitoring the downlink shared channel resource in the scheduled occasion for the DCI based on the indication. The operations of 1410 may be performed in accordance with examples as disclosed herein. In some examples, aspects of the operations of 1410 may be performed by a PDSCH monitoring component 730 as described with reference to FIG. 7.

At 1415, the method may include determining an index of a table of uplink control channel resource sets based on the one or more parameters of the DCI. The operations of 14150 may be performed in accordance with examples as disclosed herein. In some examples, aspects of the operations of 14150 may be performed by an PUCCH resource set table component 745 as described with reference to FIG. 7.

At 1420, the method may include selecting the set of uplink control channel resources from the table of uplink control channel resource sets based on the index. The operations of 1420 may be performed in accordance with examples as disclosed herein. In some examples, aspects of the operations of 1420 may be performed by the PUCCH resource set table component 745 as described with reference to FIG. 7.

At 1425, the method may include transmitting an uplink control message to the base station using the set of uplink control channel resources. The operations of 1425 may be performed in accordance with examples as disclosed herein. In some examples, aspects of the operations of 1425 may be performed by an uplink control message component 740 as described with reference to FIG. 7.

Figure 15:
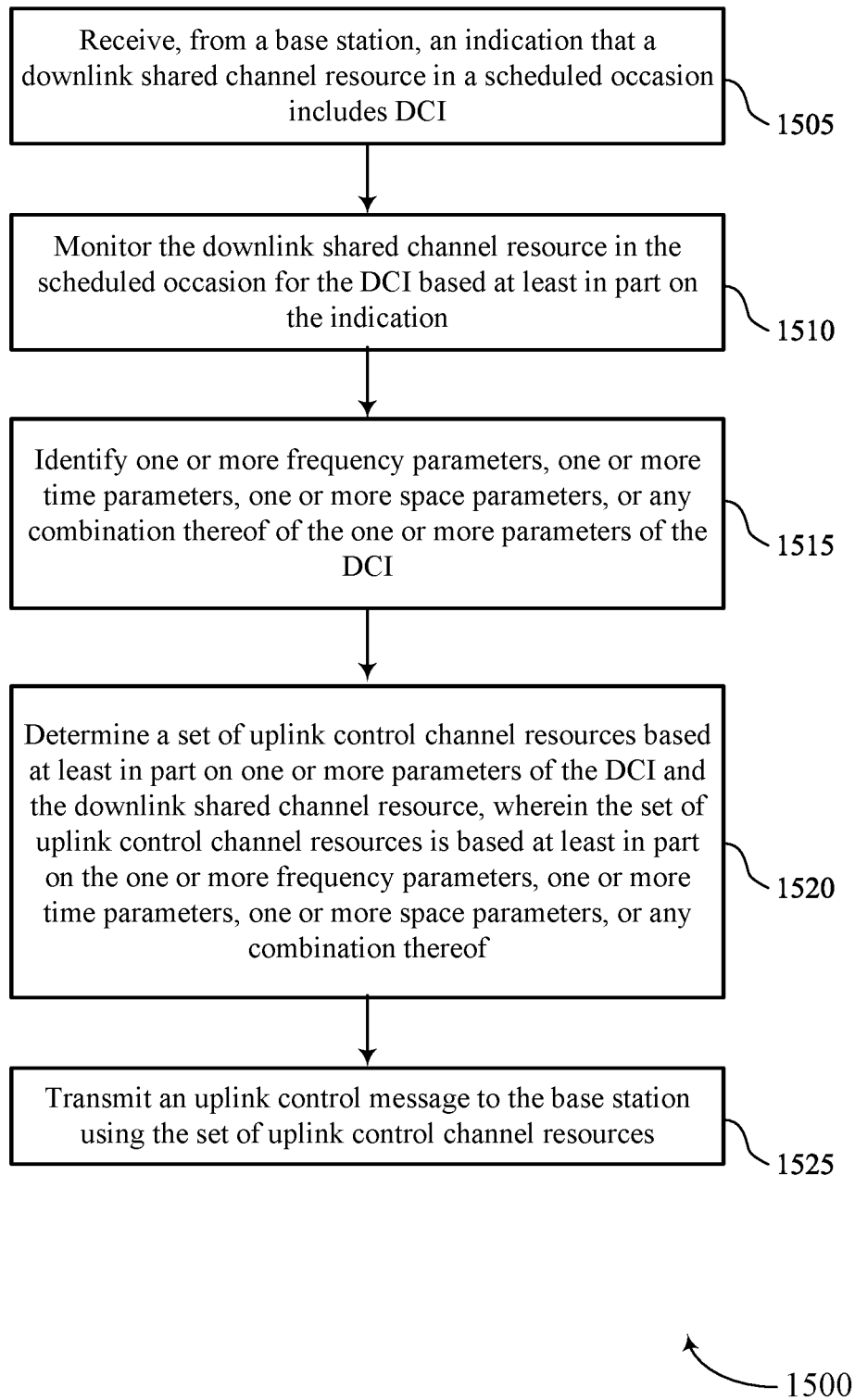

FIG. 15 shows a flowchart illustrating a method 1500 that supports implicit uplink control channel resource allocation in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, an indication that a downlink shared channel resource in a scheduled occasion includes DCI. The operations of 1505 may be performed in accordance with examples as disclosed herein. In some examples, aspects of the operations of 1505 may be performed by DCI indication component 725 as described with reference to FIG. 7.

At 1510, the method may include monitoring the downlink shared channel resource in the scheduled occasion for the DCI based on the indication. The operations of 1510 may be performed in accordance with examples as disclosed herein. In some examples, aspects of the operations of 1510 may be performed by a PDSCH monitoring component 730 as described with reference to FIG. 7.

At 1515, the method may include identifying one or more frequency parameters, one or more time parameters, one or more space parameters, or any combination thereof of the one or more parameters of the DCI. The operations of 1515 may be performed in accordance with examples as disclosed herein. In some examples, aspects of the operations of 1515 may be performed by an uplink resource determining component 735 as described with reference to FIG. 7.

At 1520, the method may include determining a set of uplink control channel resources based on one or more parameters of the DCI and the downlink shared channel resource, where the set of uplink control channel resources is based on the one or more frequency parameters, one or more time parameters, one or more space parameters, or any combination thereof. The operations of 1520 may be performed in accordance with examples as disclosed herein. In some examples, aspects of the operations of 1520 may be performed by an uplink resource determining component 735 as described with reference to FIG. 7.

At 1525, the method may include transmitting an uplink control message to the base station using the set of uplink control channel resources. The operations of 1525 may be performed in accordance with examples as disclosed herein. In some examples, aspects of the operations of 1525 may be performed by an uplink control message component 740 as described with reference to FIG. 7.

Figure 16:
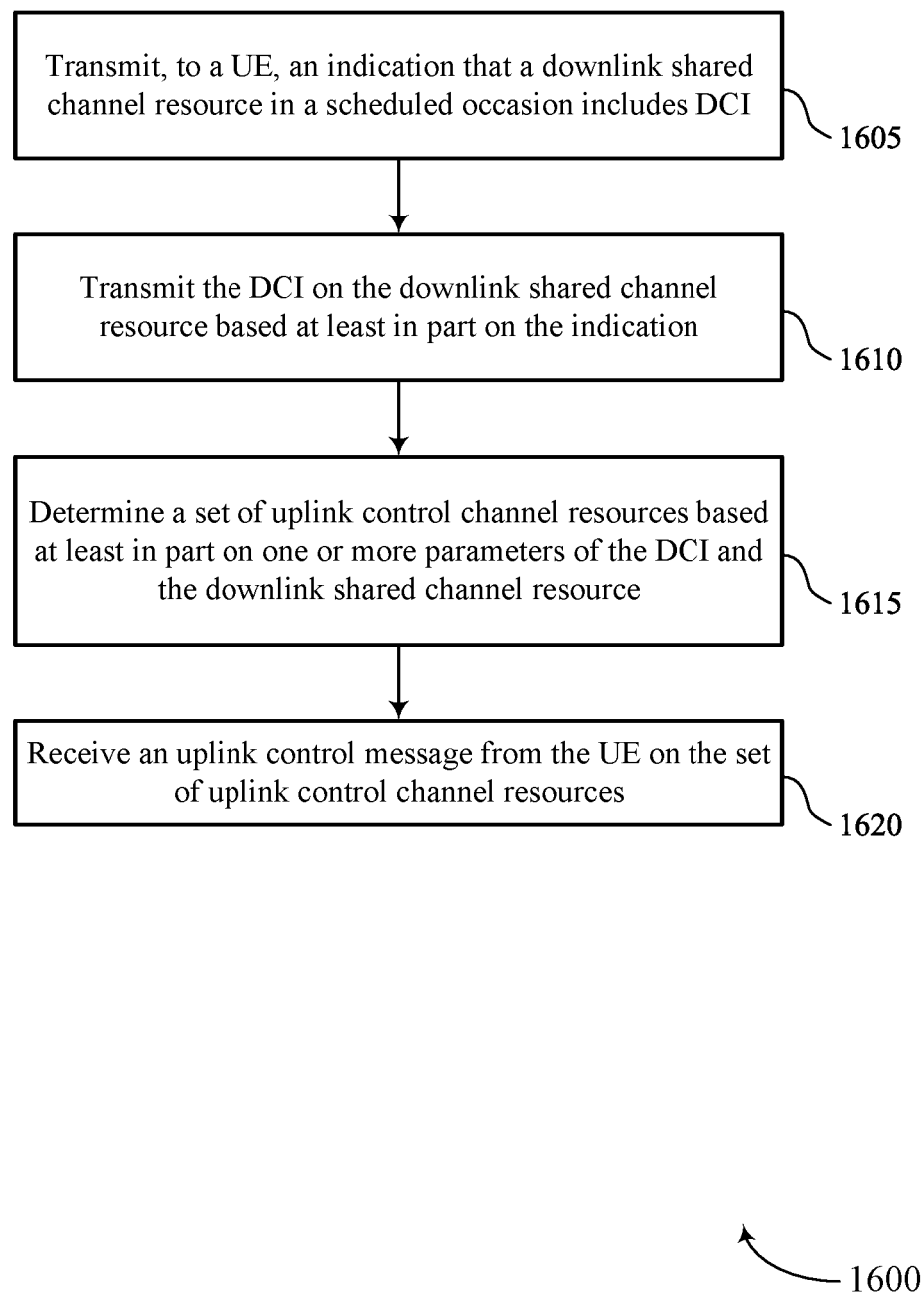

FIG. 16 shows a flowchart illustrating a method 1600 that supports implicit uplink control channel resource allocation in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, an indication that a downlink shared channel resource in a scheduled occasion includes DCI. The operations of 1605 may be performed in accordance with examples as disclosed herein. In some examples, aspects of the operations of 1605 may be performed by an DCI indication component 1125 as described with reference to FIG. 11.

At 1610, the method may include transmitting the DCI on the downlink shared channel resource based on the indication. The operations of 1610 may be performed in accordance with examples as disclosed herein. In some examples, aspects of the operations of 1610 may be performed by a DCI component 1130 as described with reference to FIG. 11.

At 1615, the method may include determining a set of uplink control channel resources based on one or more parameters of the DCI and the downlink shared channel resource. The operations of 1615 may be performed in accordance with examples as disclosed herein. In some examples, aspects of the operations of 1615 may be performed by an uplink control channel component 1135 as described with reference to FIG. 11.

At 1620, the method may include receiving an uplink control message from the UE on the set of uplink control channel resources. The operations of 1620 may be performed in accordance with examples as disclosed herein. In some examples, aspects of the operations of 1620 may be performed by an uplink control message reception component 1140 as described with reference to FIG. 11.

Figure 17:
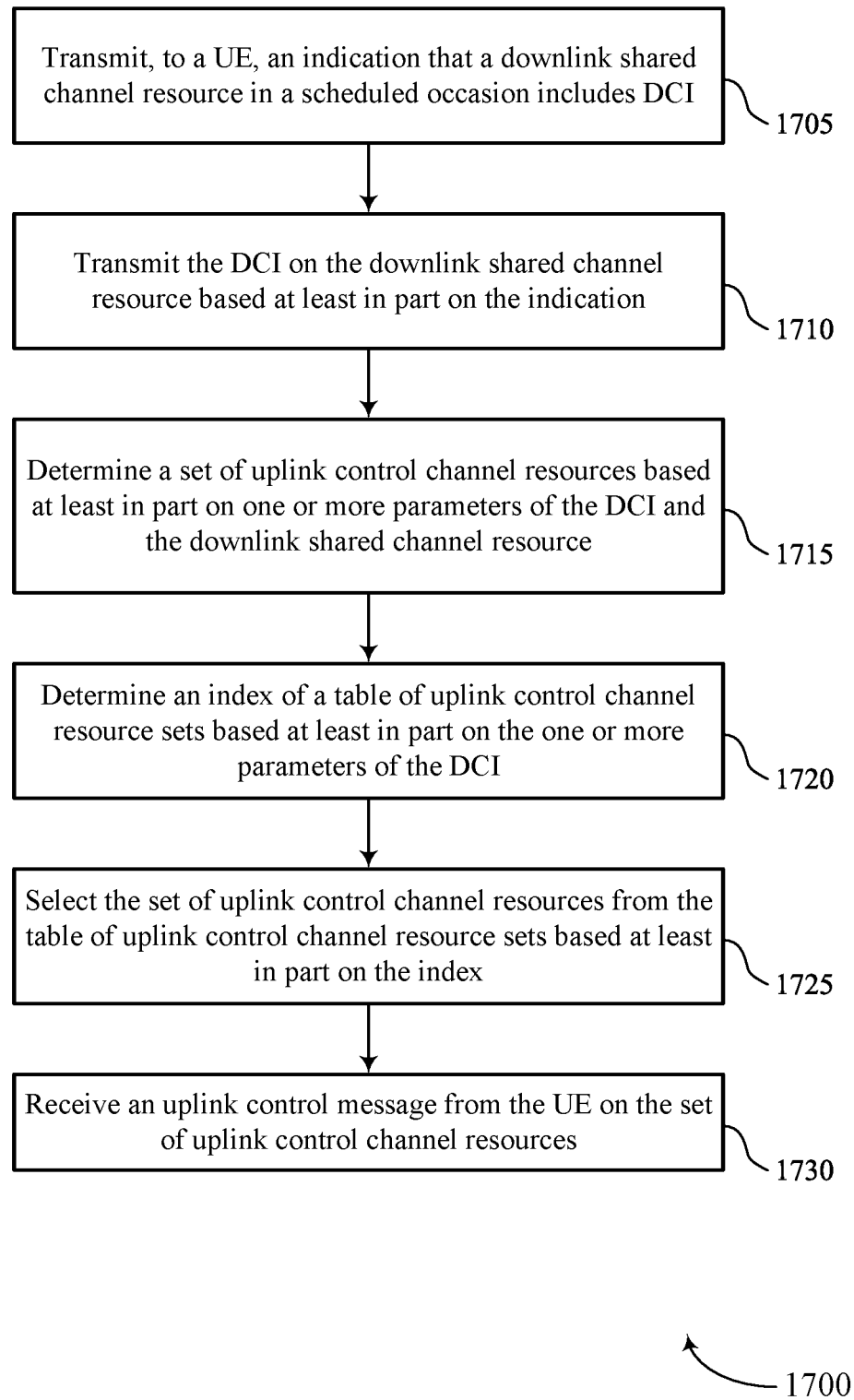

FIG. 17 shows a flowchart illustrating a method 1700 that supports implicit uplink control channel resource allocation in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, an indication that a downlink shared channel resource in a scheduled occasion includes DCI. The operations of 1705 may be performed in accordance with examples as disclosed herein. In some examples, aspects of the operations of 1705 may be performed by an DCI indication component 1125 as described with reference to FIG. 11.

At 1710, the method may include transmitting the DCI on the downlink shared channel resource based on the indication. The operations of 1710 may be performed in accordance with examples as disclosed herein. In some examples, aspects of the operations of 1710 may be performed by a DCI component 1130 as described with reference to FIG. 11.

At 1715, the method may include determining a set of uplink control channel resources based on one or more parameters of the DCI and the downlink shared channel resource. The operations of 1715 may be performed in accordance with examples as disclosed herein. In some examples, aspects of the operations of 1715 may be performed by an uplink control channel component 1135 as described with reference to FIG. 11.

At 1720, the method may include determining an index of a table of uplink control channel resource sets based on the one or more parameters of the DCI. The operations of 1720 may be performed in accordance with examples as disclosed herein. In some examples, aspects of the operations of 1720 may be performed by an uplink control channel component 1135 as described with reference to FIG. 11.

At 1725, the method may include selecting the set of uplink control channel resources from the table of uplink control channel resource sets based on the index. The operations of 1725 may be performed in accordance with examples as disclosed herein. In some examples, aspects of the operations of 1725 may be performed by an uplink control channel component 1135 as described with reference to FIG. 11.

At 1730, the method may include receiving an uplink control message from the UE on the set of uplink control channel resources. The operations of 1730 may be performed in accordance with examples as disclosed herein. In some examples, aspects of the operations of 1730 may be performed by an uplink control message reception component 1140 as described with reference to FIG. 11.

The following provides an overview of aspects of the present disclosure:

Aspect 1: A method for wireless communications at a UE, comprising: receiving, from a base station, an indication that a downlink shared channel resource in a scheduled occasion includes DCI; monitoring the downlink shared channel resource in the scheduled occasion for the DCI based at least in part on the indication; determining a set of uplink control channel resources based at least in part on one or more parameters of the DCI and the downlink shared channel resource; and transmitting an uplink control message to the base station using the set of uplink control channel resources.

Aspect 2: The method of aspect 1, wherein determining the set of uplink control channel resources comprises: determining an index of a table of uplink control channel resource sets based at least in part on the one or more parameters of the DCI; and selecting the set of uplink control channel resources from the table of uplink control channel resource sets based at least in part on the index.

Aspect 3: The method of aspect 2, wherein the table of uplink control channel resource sets comprises a plurality of uplink control channel resources with a plurality of sizes based at least in part on a length in time, a length in frequency, cyclic shift information, cover code information, or any combination thereof.

Aspect 4: The method of any of aspects 1 through 3, wherein determining the set of uplink control channel resources comprises: identifying a field of the DCI, the field indicating the set of uplink control channel resources, wherein the set of uplink control channel resources are identified based at least in part on the field indicating the set of uplink control channel resources.

Aspect 5: The method of any of aspects 1 through 4, wherein the one or more parameters of the DCI on the downlink shared channel resource implicitly indicate the set of uplink control channel resources.

Aspect 6: The method of any of aspects 1 through 5, wherein determining the set of uplink control channel resources comprises: identifying one or more frequency parameters, one or more time parameters, one or more space parameters, or any combination thereof of the one or more parameters of the DCI, wherein the set of uplink control channel resources is based at least in part on the one or more frequency parameters, one or more time parameters, one or more space parameters, or any combination thereof.

Aspect 7: The method of aspect 6, wherein the one or more frequency parameters include a starting resource block or a starting resource element of the DCI within the downlink shared channel resource, a length of the DCI in frequency, a frequency interleaving pattern of the DCI, a frequency hopping pattern of the DCI, or any combination thereof.

Aspect 8: The method of any of aspects 6 through 7, wherein the one or more time parameters include a starting symbol of the DCI in the downlink shared channel resource, a length of the DCI in time, a time interleaving pattern of the DCI, a code used for DCI bits, or any combination thereof.

Aspect 9: The method of any of aspects 6 through 8, wherein the one or more space parameters include antennas used for transmission of the DCI on the downlink shared channel resource or a TCI state configured for the DCI, or both.

Aspect 10: The method of any of aspects 6 through 9, wherein the one or more parameters include a format of the DCI, a location of demodulation reference signal symbols allocated to the DCI within the downlink shared channel resource, an RNTI used to scramble a cyclic redundancy check of the DCI, a cyclic shift used for bits of the DCI, or any combination thereof.

Aspect 11: The method of any of aspects 1 through 10, wherein a plurality of different sets of parameters for the DCI transmitted on the downlink shared channel resource correspond to the set of uplink control channel resources.

Aspect 12: The method of any of aspects 1 through 11, wherein the control message includes an HARQ feedback, a CSI report, a scheduling request, or any combination thereof.

Aspect 13: The method of any of aspects 1 through 12, wherein receiving the indication that the downlink shared channel resource in the scheduled occasion includes the DCI comprises: receiving a second DCI on a downlink control channel indicating that the downlink shared channel resource includes the DCI.

Aspect 14: A method for wireless communications at a base station, comprising: transmitting, to a UE, an indication that a downlink shared channel resource in a scheduled occasion includes DCI; transmitting the DCI on the downlink shared channel resource for the DCI based at least in part on the indication; determining a set of uplink control channel resources based at least in part on one or more parameters of the DCI and the downlink shared channel resource; and receiving an uplink control message from the UE on the set of uplink control channel resources.

Aspect 15: The method of aspect 14, wherein determining the set of uplink control channel resources comprises: determining an index of a table of uplink control channel resource sets based at least in part on the one or more parameters of the DCI; and selecting the set of uplink control channel resources from the table of uplink control channel resource sets based at least in part on the index.

Aspect 16: The method of any of aspects 14 through 15, wherein determining the set of uplink control channel resources comprises: identifying a field of the DCI, the field indicating the set of uplink control channel resources, wherein the set of uplink control channel resources are identified based at least in part on the field indicating the set of uplink control channel resources.

Aspect 17: The method of any of aspects 14 through 16, wherein the one or more parameters of the DCI on the downlink shared channel resource implicitly indicate the set of uplink control channel resources.

Aspect 18: The method of any of aspects 14 through 17, wherein determining the set of uplink control channel resources comprises: identifying one or more frequency parameters, one or more time parameters, one or more space parameters, or any combination thereof of the one or more parameters of the DCI, wherein the set of uplink control channel resources is based at least in part on the one or more frequency parameters, one or more time parameters, one or more space parameters, or any combination thereof.

Aspect 19: The method of aspect 18, wherein the one or more frequency parameters include a starting resource block or a starting resource element of the DCI within the downlink shared channel resource, a length of the DCI in frequency, a frequency interleaving pattern of the DCI, a frequency hopping pattern of the DCI, or any combination thereof.

Aspect 20: The method of any of aspects 18 through 19, wherein the one or more time parameters include a starting symbol of the DCI in the downlink shared channel resource, a length of the DCI in time, a time interleaving pattern of the DCI, a code used for DCI bits, or any combination thereof.

Aspect 21: The method of any of aspects 18 through 20, wherein the one or more space parameters include antennas used to transmit the DCI on the downlink shared channel resource or a TCI state configured for the DCI, or both.

Aspect 22: The method of any of aspects 18 through 21, wherein the one or more parameters include a format of the DCI, a location of demodulation reference signal symbols allocated to the DCI within the downlink shared channel resource, an RNTI used to scramble a cyclic redundancy check of the DCI, a cyclic shift used for bits of the DCI, or any combination thereof.

Aspect 23: The method of any of aspects 14 through 22, wherein a plurality of different sets of parameters for the DCI transmitted on the downlink shared channel resource correspond to the set of uplink control channel resources.

Aspect 24: The method of any of aspects 14 through 23, wherein receiving the uplink control message comprises: receiving an HARQ feedback message, a CSI report, a scheduling request, or any combination thereof.

Aspect 25: The method of any of aspects 14 through 24, wherein transmitting the indication that the downlink shared channel resource in the scheduled occasion includes the DCI comprises: transmitting a second DCI on a downlink control channel indicating that the downlink shared channel resource includes the DCI.

Aspect 26: An apparatus for wireless communications at a UE, comprising a processor; memory coupled with the processor; and instructions stored in the memory and executable by the processor to cause the apparatus to perform a method of any of aspects 1 through 13.

Aspect 27: An apparatus for wireless communications at a UE, comprising at least one means for performing a method of any of aspects 1 through 13.

Aspect 28: A non-transitory computer-readable medium storing code for wireless communications at a UE, the code comprising instructions executable by a processor to perform a method of any of aspects 1 through 13.

Aspect 29: An apparatus for wireless communications at a base station, comprising a processor; memory coupled with the processor; and instructions stored in the memory and executable by the processor to cause the apparatus to perform a method of any of aspects 14 through 25.

Aspect 30: An apparatus for wireless communications at a base station, comprising at least one means for performing a method of any of aspects 14 through 25.

Aspect 31: A non-transitory computer-readable medium storing code for wireless communications at a base station, the code comprising instructions executable by a processor to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving signaling that indicates semi-persistently scheduled downlink shared channel resources for a semi-persistently scheduled downlink shared channel, wherein the semi-persistently scheduled downlink shared channel resources are associated with one or more configurations different than non-semi-persistently scheduled downlink shared channel resources;
    receiving an indication that semi-persistently scheduled downlink control information is included in a semi-persistently scheduled downlink shared channel resource of the semi-persistently scheduled downlink shared channel resources for the semi-persistently scheduled downlink shared channel;
    receiving, based at least in part on the indication, the semi-persistently scheduled downlink control information via the semi-persistently scheduled downlink shared channel resource; and
    transmitting an uplink control message using a set of uplink control channel resources based at least in part on the semi-persistently scheduled downlink control information, wherein the set of uplink control channel resources is indicated by one or more parameters of the semi-persistently scheduled downlink control information received via the semi-persistently scheduled downlink shared channel resource, and wherein the one or more parameters comprise at least the one or more configurations associated with the semi-persistently scheduled downlink shared channel resources.

2. The method of claim 1, further comprising:
    determining an index of a table of uplink control channel resource sets based at least in part on the one or more parameters of the semi-persistently scheduled downlink control information; and
    selecting the set of uplink control channel resources from the table of uplink control channel resource sets based at least in part on the index, wherein the uplink control message is transmitted using the selected set of uplink control channel resources.

3. The method of claim 2, wherein the table of uplink control channel resource sets comprises a plurality of uplink control channel resources with a plurality of sizes based at least in part on a length in time, a length in frequency, cyclic shift information, cover code information, or any combination thereof.

4. The method of claim 1, wherein transmitting the uplink control message using the set of uplink control channel resources comprises:
    transmitting the uplink control message based at least in part on a field of the semi-persistently scheduled downlink control information, the field indicating the set of uplink control channel resources.

5. The method of claim 1, wherein the one or more parameters of the semi-persistently scheduled downlink control information on the semi-persistently scheduled downlink shared channel resource implicitly indicate the set of uplink control channel resources.

6. The method of claim 1, wherein transmitting the uplink control message using the set of uplink control channel resources comprises:
    transmitting the uplink control message based at least in part on one or more frequency parameters, one or more time parameters, one or more space parameters, or any combination thereof of the one or more parameters of the semi-persistently scheduled downlink control information, wherein the set of uplink control channel resources is based at least in part on the one or more frequency parameters, the one or more time parameters, the one or more space parameters, or any combination thereof.

7. The method of claim 6, wherein the one or more frequency parameters include a starting resource block or a starting resource element of the semi-persistently scheduled downlink control information within the semi-persistently scheduled downlink shared channel resource, a length of the semi-persistently scheduled downlink control information in frequency, a frequency interleaving pattern of the semi-persistently scheduled downlink control information, a frequency hopping pattern of the semi-persistently scheduled downlink control information, or any combination thereof.

8. The method of claim 6, wherein the one or more time parameters include a starting symbol of the semi-persistently scheduled downlink control information in the semi-persistently scheduled downlink shared channel resource, a length of the semi-persistently scheduled downlink control information in time, a time interleaving pattern of the semi-persistently scheduled downlink control information, a code used for downlink control information bits, or any combination thereof.

9. The method of claim 6, wherein the one or more space parameters include antennas used for transmission of the semi-persistently scheduled downlink control information on the semi-persistently scheduled downlink shared channel resource or a transmission configuration indicator (TCI) state configured for the semi-persistently scheduled downlink control information, or both.

10. The method of claim 6, wherein the one or more parameters include a format of the semi-persistently scheduled downlink control information, a location of demodulation reference signal symbols allocated to the semi-persistently scheduled downlink control information within the semi-persistently scheduled downlink shared channel resource, a radio network temporary identifier (RNTI) used to scramble a cyclic redundancy check of the semi-persistently scheduled downlink control information, a cyclic shift used for bits of the semi-persistently scheduled downlink control information, or any combination thereof.

11. The method of claim 1, wherein a plurality of different sets of parameters for the semi-persistently scheduled downlink control information transmitted on the semi-persistently scheduled downlink shared channel resource correspond to the set of uplink control channel resources.

12. The method of claim 1, wherein the uplink control message includes a hybrid automatic repeat request (HARQ) feedback, a channel state information (CSI) report, a scheduling request, or any combination thereof.

13. The method of claim 1, wherein receiving the indication that the semi-persistently scheduled downlink shared channel resource includes the semi-persistently scheduled downlink control information comprises:
receiving a second downlink control information on a downlink control channel indicating that the semi-persistently scheduled downlink shared channel resource includes the semi-persistently scheduled downlink control information.

14. A method for wireless communications at a network device, comprising:
transmitting signaling that indicates semi-persistently scheduled downlink shared channel resources for a semi-persistently scheduled downlink shared channel, wherein the semi-persistently scheduled downlink shared channel resources are associated with one or more configurations different than non-semi-persistently scheduled downlink shared channel resources;
transmitting an indication that a semi-persistently scheduled downlink shared channel resource of the semi-persistently scheduled downlink shared channel resources for the semi-persistently scheduled downlink shared channel includes semi-persistently scheduled downlink control information;
transmitting the semi-persistently scheduled downlink control information on the semi-persistently scheduled downlink shared channel resource based at least in part on the indication; and
receiving an uplink control message via a set of uplink control channel resources based at least in part on one or more parameters of the semi-persistently scheduled downlink control information and the semi-persistently scheduled downlink shared channel resource, wherein the one or more parameters comprise at least the one or more configurations associated with the semi-persistently scheduled downlink shared channel resources.

15. The method of claim 14, further comprising:
determining an index of a table of uplink control channel resource sets based at least in part on the one or more parameters of the semi-persistently scheduled downlink control information; and
selecting the set of uplink control channel resources from the table of uplink control channel resource sets based at least in part on the index, wherein the uplink control message is received via the selected set of uplink control channel resources.

16. The method of claim 14, wherein receiving the uplink control message via the set of uplink control channel resources comprises:
receiving the uplink control message based at least in part on a field of the semi-persistently scheduled downlink control information, the field indicating the set of uplink control channel resources.

17. The method of claim 14, wherein the one or more parameters of the semi-persistently scheduled downlink control information on the semi-persistently scheduled downlink shared channel resource implicitly indicate the set of uplink control channel resources.

18. The method of claim 14, wherein receiving the uplink control message via the set of uplink control channel resources comprises:
receiving the uplink control message based at least in part on one or more frequency parameters, one or more time parameters, one or more space parameters, or any combination thereof of the one or more parameters of the semi-persistently scheduled downlink control information, wherein the set of uplink control channel resources is based at least in part on the one or more frequency parameters, the one or more time parameters, the one or more space parameters, or any combination thereof.

19. The method of claim 18, wherein the one or more frequency parameters include a starting resource block or a starting resource element of the semi-persistently scheduled downlink control information within the semi-persistently scheduled downlink shared channel resource, a length of the semi-persistently scheduled downlink control information in frequency, a frequency interleaving pattern of the semi-persistently scheduled downlink control information, a frequency hopping pattern of the semi-persistently scheduled downlink control information, or any combination thereof.

20. The method of claim 18, wherein the one or more time parameters include a starting symbol of the semi-persistently scheduled downlink control information in the semi-persistently scheduled downlink shared channel resource, a length of the semi-persistently scheduled downlink control information in time, a time interleaving pattern of the semi-persistently scheduled downlink control information, a code used for downlink control information bits, or any combination thereof.

21. The method of claim 18, wherein the one or more space parameters include antennas used to transmit the semi-persistently scheduled downlink control information on the semi-persistently scheduled downlink shared channel resource or a transmission configuration indicator (TCI) state configured for the semi-persistently scheduled downlink control information, or both.

22. The method of claim 18, wherein the one or more parameters include a format of the semi-persistently scheduled downlink control information, a location of demodulation reference signal symbols allocated to the semi-persistently scheduled downlink control information within the semi-persistently scheduled downlink shared channel resource, a radio network temporary identifier (RNTI) used to scramble a cyclic redundancy check of the semi-persistently scheduled downlink control information, a cyclic shift used for bits of the semi-persistently scheduled downlink control information, or any combination thereof.

23. The method of claim 14, wherein a plurality of different sets of parameters for the semi-persistently scheduled downlink control information transmitted on the semi-persistently scheduled downlink shared channel resource correspond to the set of uplink control channel resources.

24. The method of claim 14, wherein receiving the uplink control message comprises:
receiving a hybrid automatic repeat request (HARQ) feedback message, a channel state information (CSI) report, a scheduling request, or any combination thereof.

25. The method of claim 14, wherein transmitting the indication that the semi-persistently scheduled downlink shared channel resource includes the semi-persistently scheduled downlink control information comprises:
transmitting a second downlink control information on a downlink control channel indicating that the semi-persistently scheduled downlink shared channel resource includes the semi-persistently scheduled downlink control information.

26. An apparatus for wireless communications at a user equipment (UE), comprising:
a processor;
memory coupled with the processor; and
instructions stored in the memory and executable by the processor to cause the apparatus to:
receive signaling that indicates semi-persistently scheduled downlink shared channel resources for a semi-persistently scheduled downlink shared channel, wherein the semi-persistently scheduled downlink shared channel resources are associated with one or more configurations different than non-semi-persistently scheduled downlink shared channel resources;
receive an indication that semi-persistently scheduled downlink control information is included in a semi-persistently scheduled downlink shared channel resource of the semi-persistently scheduled downlink shared channel resources for the semi-persistently scheduled downlink shared channel;
receive, based at least in part on the indication, the semi-persistently scheduled downlink control information via the semi-persistently scheduled downlink shared channel resource; and
transmit an uplink control message using a set of uplink control channel resources based at least in part on the semi-persistently scheduled downlink control information, wherein the set of uplink control channel resources is indicated by one or more parameters of the semi-persistently scheduled downlink control information received via the semi-persistently scheduled downlink shared channel resource, and wherein the one or more parameters comprise at least the one or more configurations associated with the semi-persistently scheduled downlink shared channel resources.

27. The apparatus of claim 26, wherein the instructions are further executable by the processor to cause the apparatus to:
determine an index of a table of uplink control channel resource sets based at least in part on the one or more parameters of the semi-persistently scheduled downlink control information; and
select the set of uplink control channel resources from the table of uplink control channel resource sets based at least in part on the index, wherein the uplink control message is transmitted using the selected set of uplink control channel resources.

28. The apparatus of claim 26, wherein the instructions to transmit the uplink control message using the set of uplink control channel resources are executable by the processor to cause the apparatus to:
transmit the uplink control message based at least in part on one or more frequency parameters, one or more time parameters, one or more space parameters, or any combination thereof of the one or more parameters of the semi-persistently scheduled downlink control information, wherein the set of uplink control channel resources is based at least in part on the one or more frequency parameters, the one or more time parameters, the one or more space parameters, or any combination thereof.

29. An apparatus for wireless communications at a network device, comprising:
a processor;
memory coupled with the processor; and
instructions stored in the memory and executable by the processor to cause the apparatus to:
transmit signaling that indicates semi-persistently scheduled downlink shared channel resources for a semi-persistently scheduled downlink shared channel, wherein the semi-persistently scheduled downlink shared channel resources are associated with one or more configurations different than non-semi-persistently scheduled downlink shared channel resources;
transmit an indication that a semi-persistently scheduled downlink shared channel resource of the semi-persistently scheduled downlink shared channel resources for the semi-persistently scheduled downlink shared channel includes semi-persistently scheduled downlink control information;
transmit the semi-persistently scheduled downlink control information on the semi-persistently scheduled downlink shared channel resource based at least in part on the indication; and
receive an uplink control message via a set of uplink control channel resources based at least in part on one or more parameters of the semi-persistently scheduled downlink control information and the semi-persistently scheduled downlink shared channel resource, wherein the one or more parameters comprise at least the one or more configurations associated with the semi-persistently scheduled downlink shared channel resources.

30. The apparatus of claim 29, wherein the instructions are further executable by the processor to cause the apparatus to:
determine an index of a table of uplink control channel resource sets based at least in part on the one or more parameters of the semi-persistently scheduled downlink control information; and
select the set of uplink control channel resources from the table of uplink control channel resource sets based at least in part on the index, wherein the uplink control message is received via the selected set of uplink control channel resources.

\* \* \* \* \*